INVENTORS:
Myron J. Mendelson
Marc Shiowitz

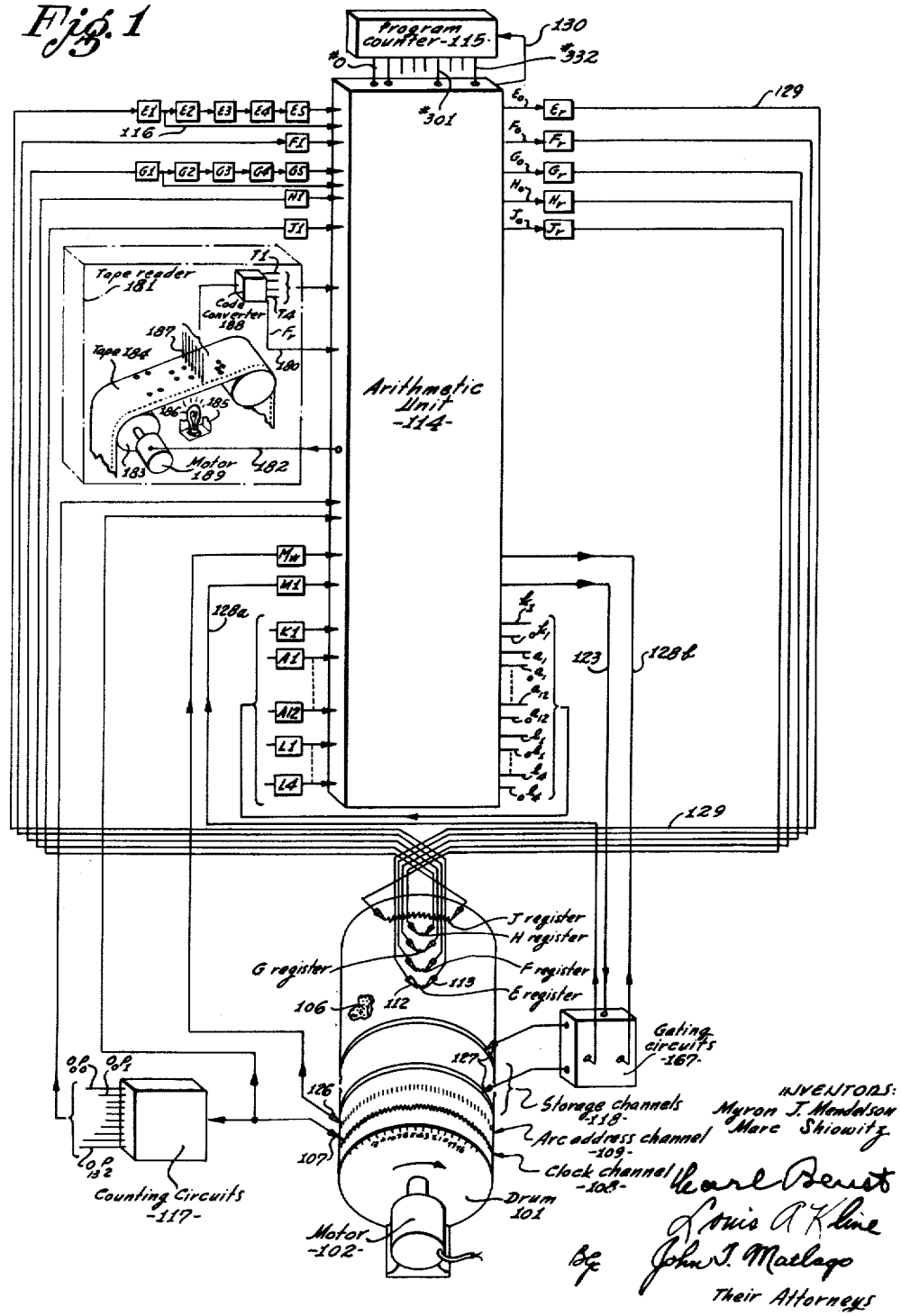

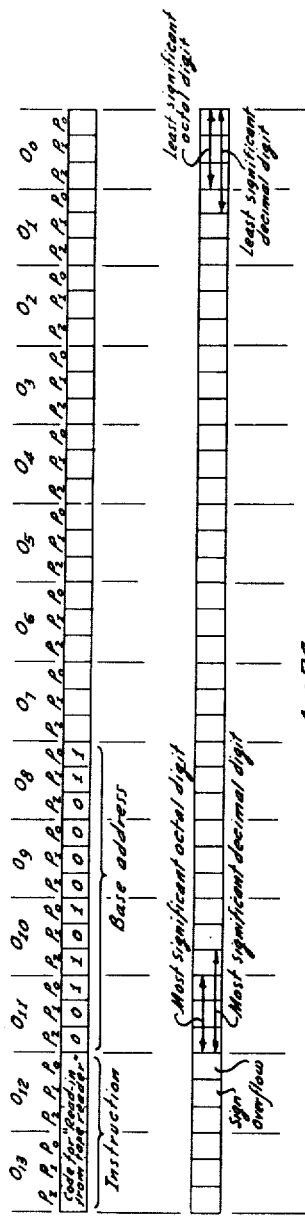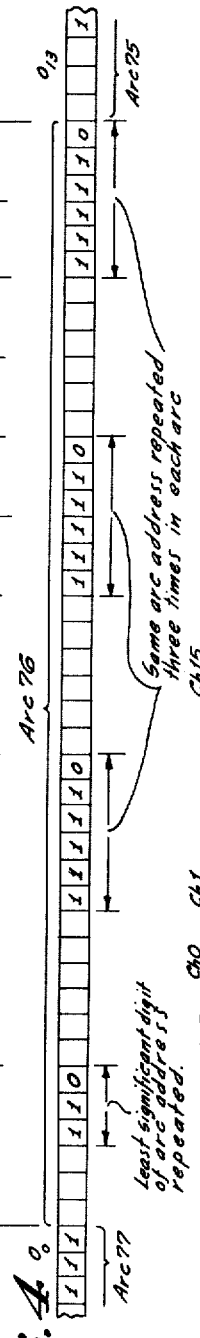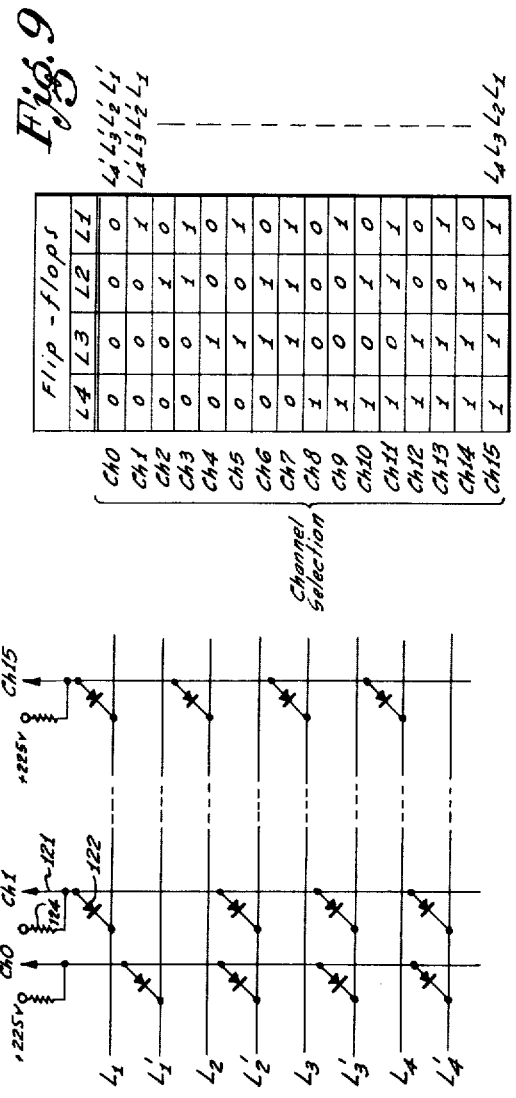

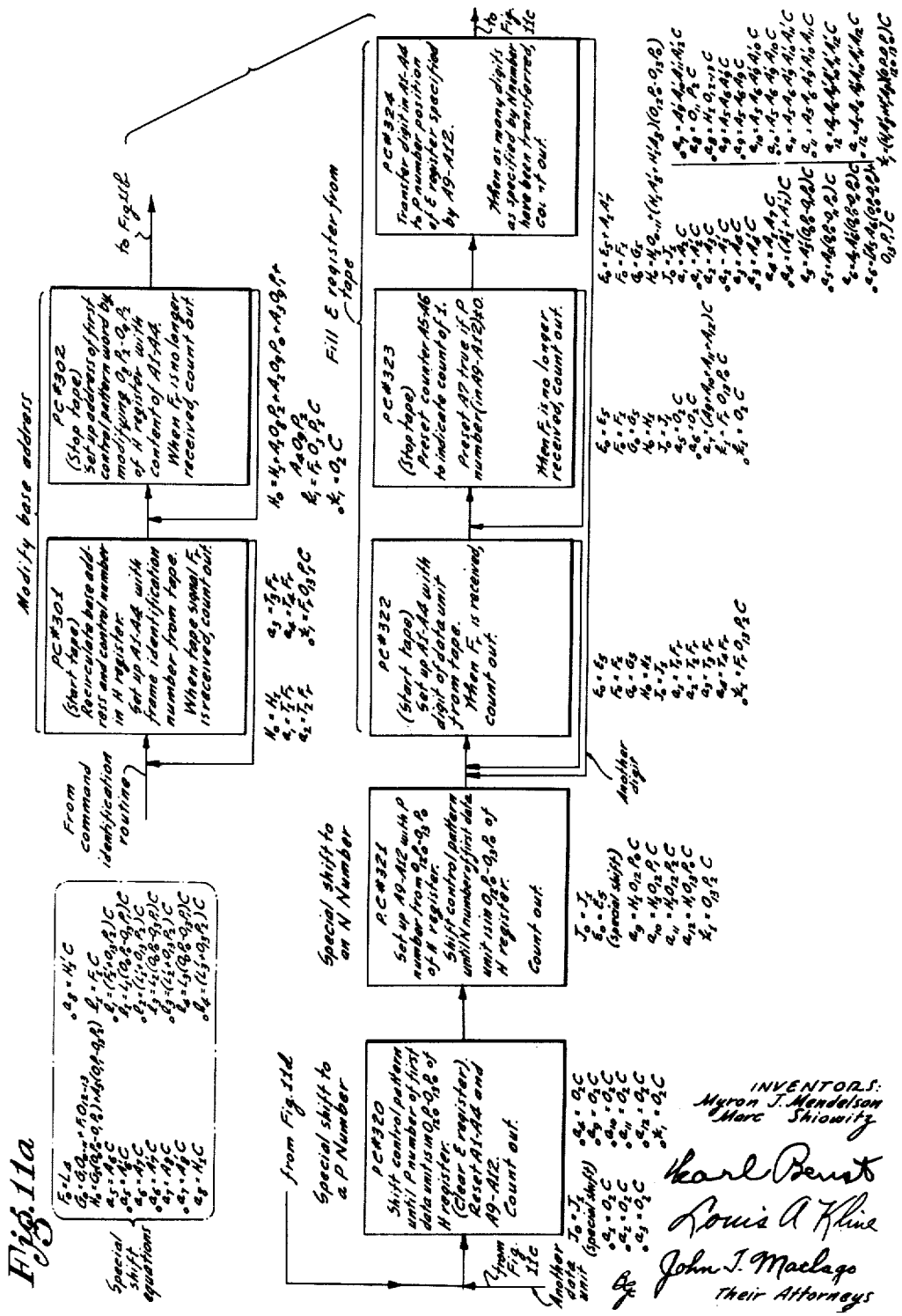

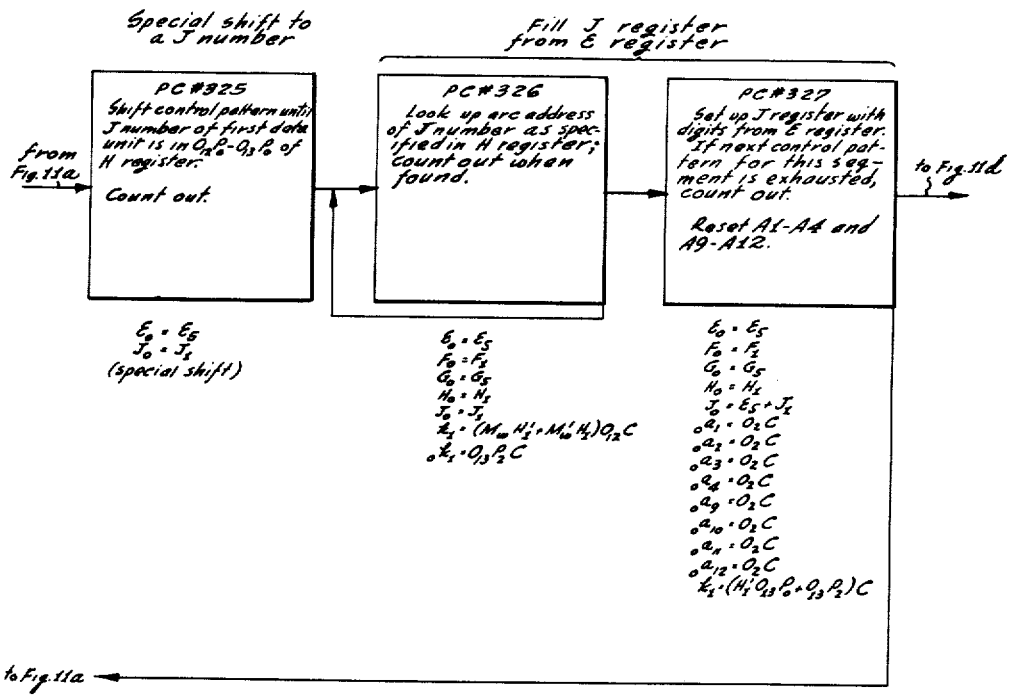

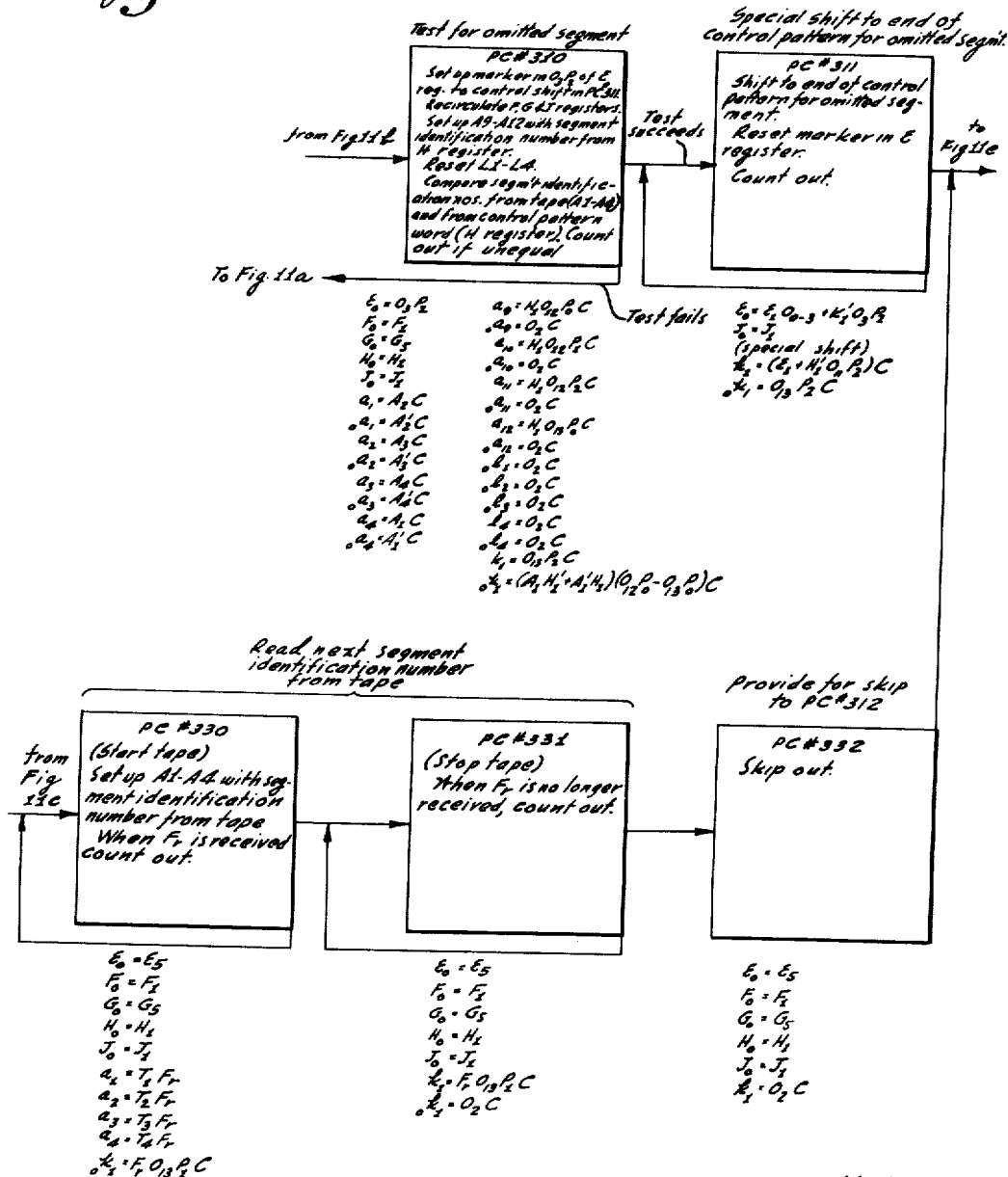

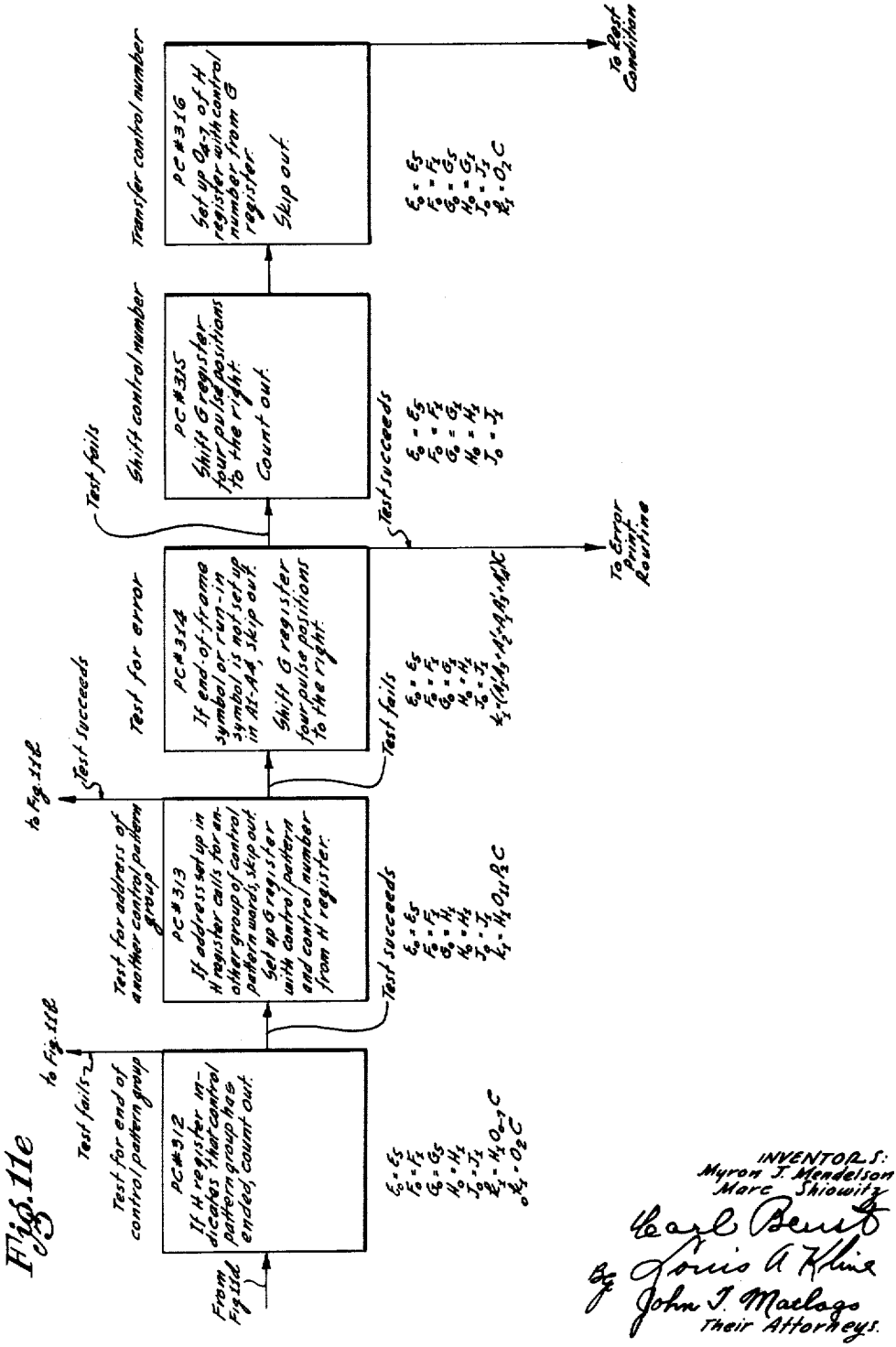

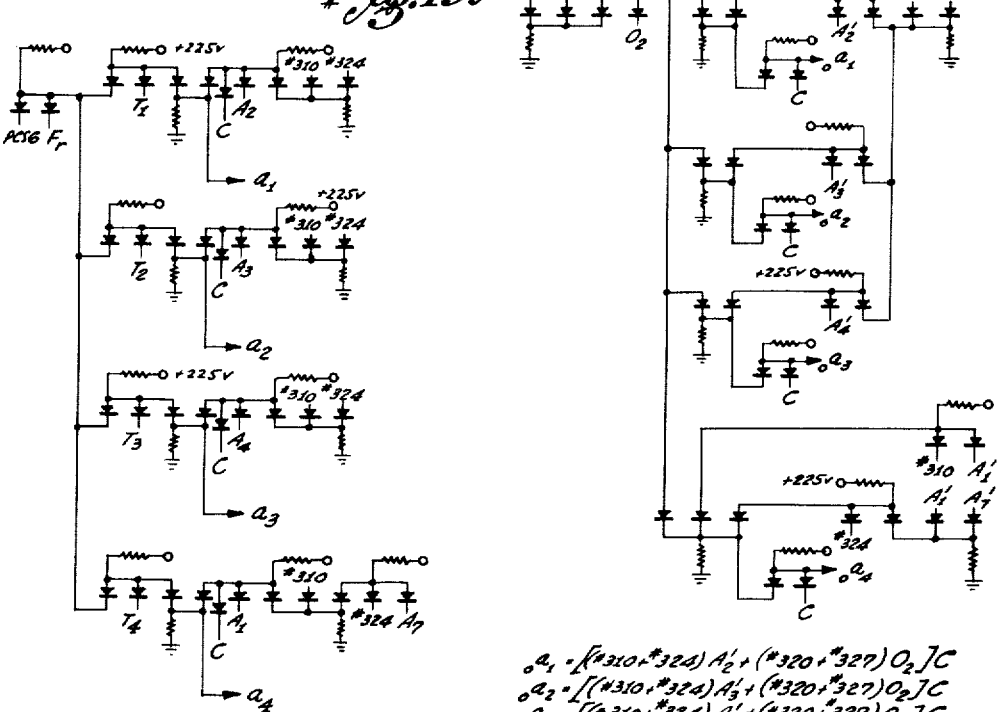

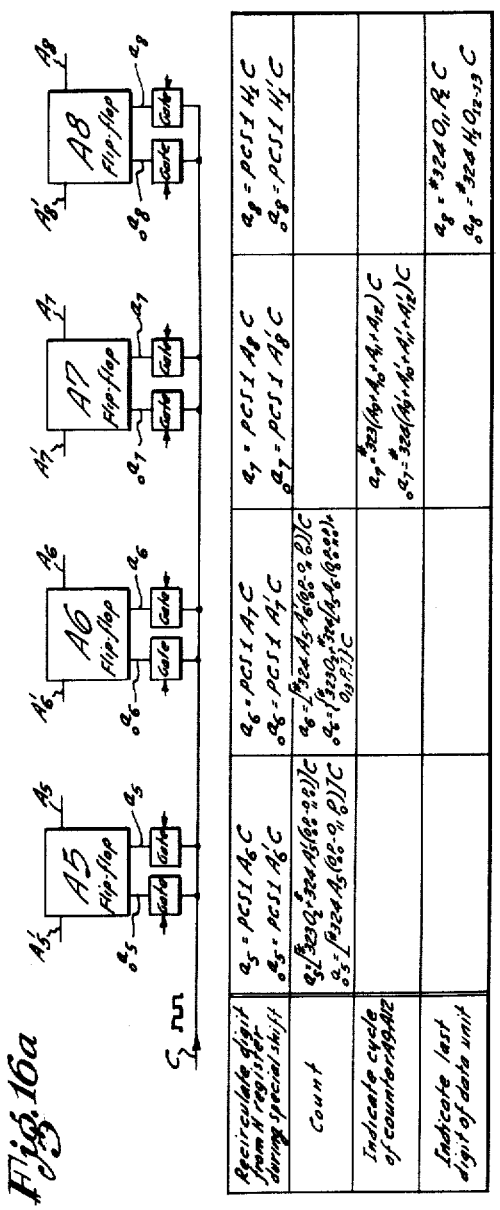
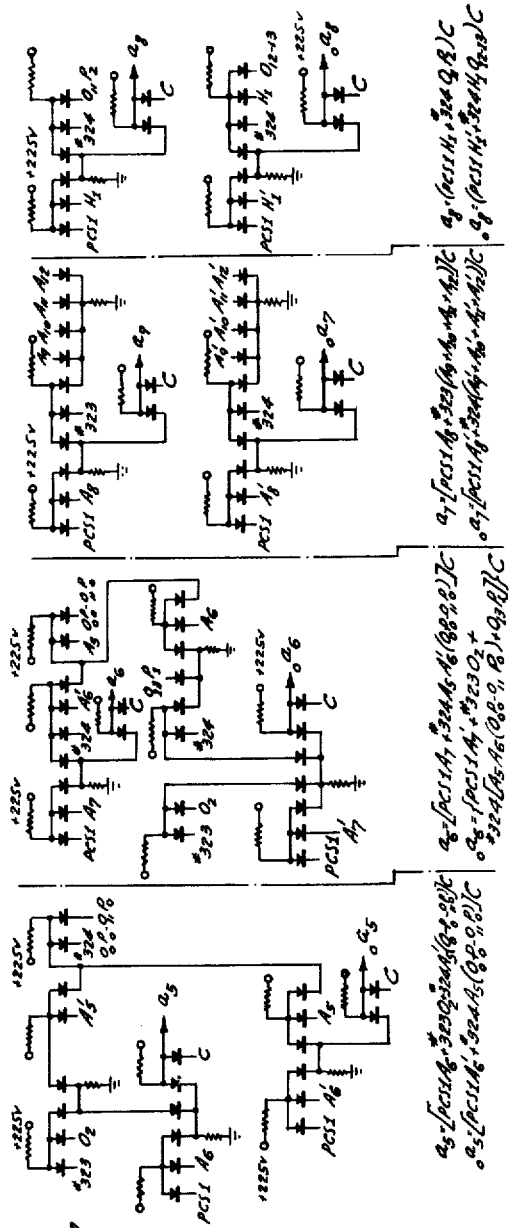
Fig. 16a
Fig. 16b $a_9 = [(\#310 + \#321)H_1 O_{12}P_0 + \#324 A_5 A_6 A_9']C$ $_o a_9 = [(\#310 + \#320 + \#327)O_2 + \#324 A_5 A_6 A_9]C$ $a_{10} = [(\#310 + \#321)H_1 O_{12}P_1 + \#324 A_5 A_6 A_9' A_{10}']C$ $_o a_{10} = [(\#310 + \#320 + \#327)O_2 + \#324 A_5 A_6 A_9 A_{10}]C$ $a_{11} = [(\#310 + \#321)H_1 O_{12}P_2 + \#324 A_5 A_6 A_9' A_{10}' A_{11}']C$ $_o a_{11} = [(\#310 + \#320 + \#327)O_2 + \#324 A_5 A_6 A_9 A_{10} A_{11}]C$ $a_{12} = [(\#310 + \#321)H_1 O_{13}P_0 + \#324 A_5 A_6 A_9' A_{10}' A_{11}' A_{12}']C$ $_o a_{12} = [(\#310 + \#320 + \#327)O_2 + \#324 A_5 A_6 A_9 A_{10} A_{11} A_{12}]C$ Jan. 26, 1960     M. J. MENDELSON ET AL     2,922,989
COMPUTER INPUT DATA CONTROL SYSTEM
Filed Nov. 3, 1955                    19 Sheets—Sheet 15

Carl Berst
Louis A. Kline
By John J. Maclago
Their Attorneys

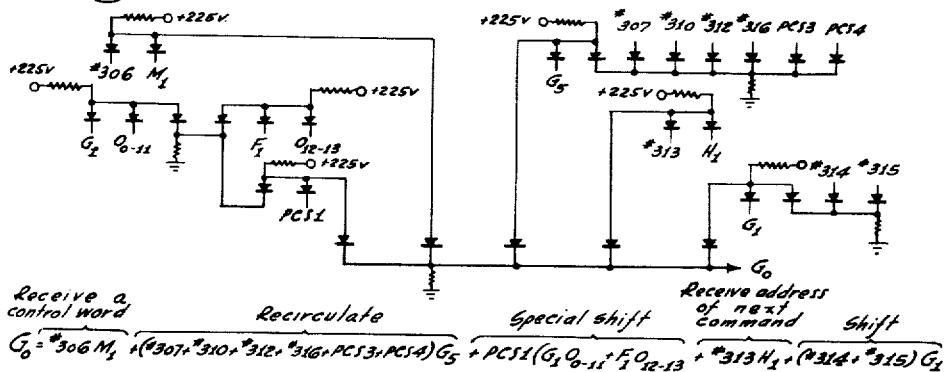
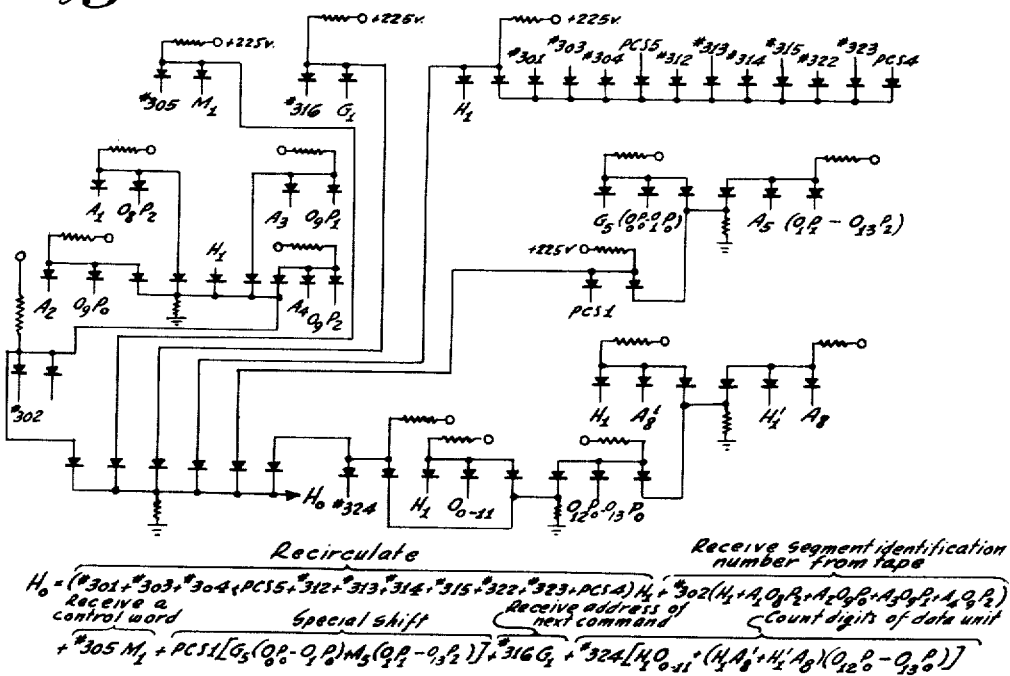

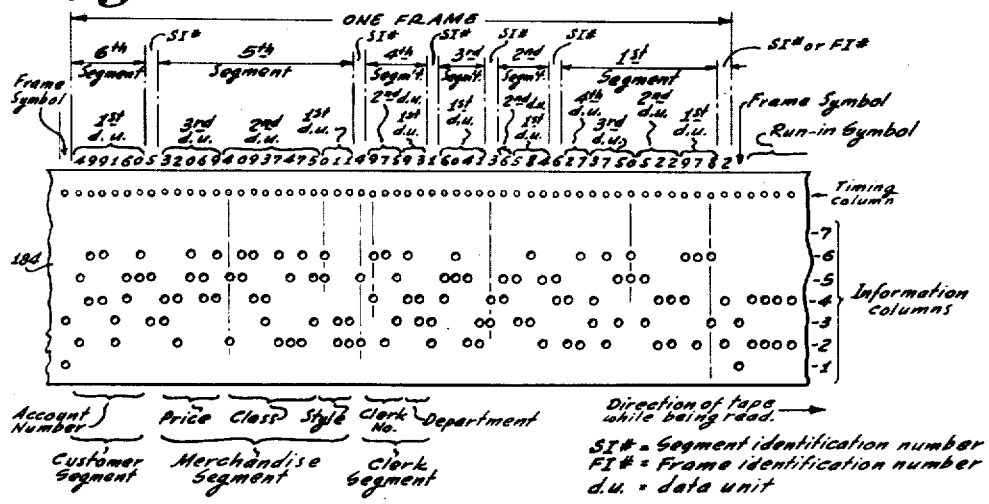

Jan. 26, 1960     M. J. MENDELSON ET AL     2,922,989

COMPUTER INPUT DATA CONTROL SYSTEM

Filed Nov. 3, 1955                 19 Sheets-Sheet 18

INVENTORS:
Myron J. Mendelson
Marc Shiowitz

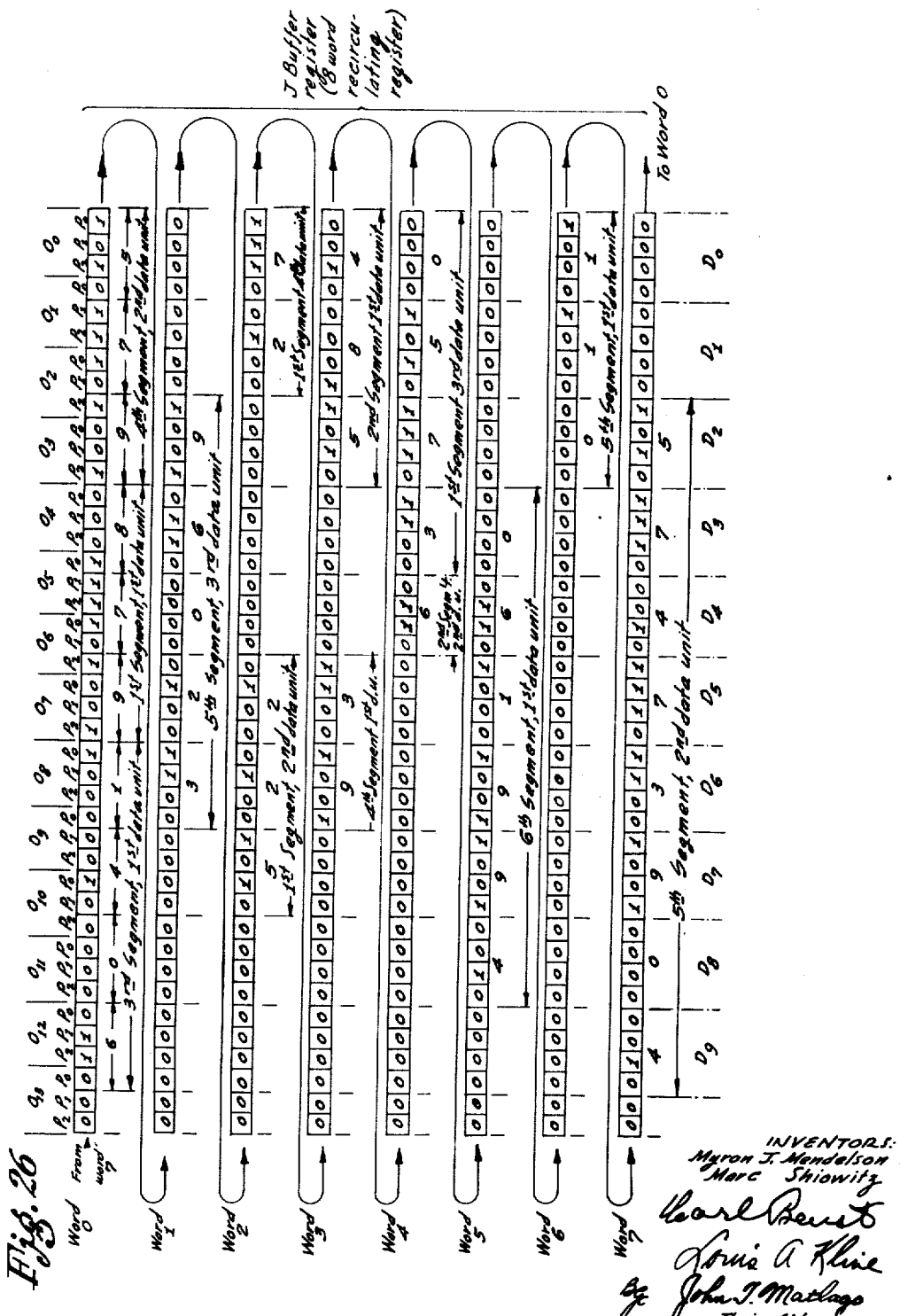

United States Patent Office 2,922,989
Patented Jan. 26, 1960

2,922,989
COMPUTER INPUT DATA CONTROL SYSTEM

Myron J. Mendelson and Marc Shiowitz, Los Angeles, Calif., assignors to The National Cash Register Company, Dayton, Ohio, a corporation of Maryland Application November 3, 1955, Serial No. 544,761

13 Claims. (Cl. 340—174)

This invention relates to digital computer read-in routines and more particularly to a system which receives digits of information from a tape reader and assigns them to computer buffer register positions in an order planned for use in subsequent computer operations directed toward inventory control, record maintenance, etc. in commerce.

Merchandising transactions, accounting operations, and similar commercial practices generally originate records which perpetuate salient information relative thereto, said records often taking a form unique to the particular transaction. Thus, where a retail department store desires, for purposes of inventory statistics, stock control, etc., a record of the conditions under which each sale is made, it is one practice to require the sales clerk to operate an automatic cash register. The register, when properly operated, records the information relative to the transaction on a medium of more or less permanent form. By way of example, one such arrangement may comprise a cash register with means for entry of information from a coded price tag associated with the merchandise and from a keyboard set up by a sales clerk in accordance with particular information characterizing the transaction, said entry being made as holes on a continuous paper tape. The price tag is removed from the merchandise and inserted into a receptacle in the register, thereby causing the price tag information to be automatically entered on the tape. The totalizer bar of the register is then depressed, causing the information on the keyboard to be entered on the tape. The information in this system is arranged as holes in the paper tape in accordance with a prescribed code. At periodic intervals, tapes from cash registers, accounting machines, and other similar devices are collected, brought to a processing center, and employed as source material for appropriate tape reading units, which, in turn, act as input equipment for a digital computer. The computer operates on the information and presents it in a form suitable for standards of record maintenance.

The arrangement of information on the cash register tape generally is such that a sequential reading thereof into the computer would preclude further orderly handling and feasibly cause the loss of the identity of the information. With reference to a possible transaction, the order of item numbers as recorded on the tape may be as follows: customer's account, price, class, style, clerk, department, etc. To be characterized by maximum utility, it is essential that these numbers be established, in a plurality of arrangements, if necessary, with regard to maintenance of the particular records indigenous to the specific commerce. Thus, where an establishment processes the information into an analysis associating the department with the total amount of its sales, it is desirable that the computer provide a unique storage for department number and price number such that minimum complexity of programming will present these as totals at the conclusion of a transactional day. Additionally, it may be desired to store the price number such that it will be available whenever the customer's account number is read out of the computer, for purposes of debiting the account with charges corresponding to all transactions for the day.

In the past the structure of the computer and its input devices have required the user to tailor the information at the source in accordance with their characteristics, in order to preclude extreme complexity of program for the computer. The system of the present invention, however, avoids source modification of the information by providing equipment and circuitry which recognizes and rearranges the information in an internal computer operation. In this way, normal operational procedures suffice for data collection.

In accordance with the system of the present invention, each combination of items (i.e., account number and price) originating with each of a plurality of transactions is set up in the computer buffer register, in a predetermined manner, such that relatively simple programming will provide for sequentially operating on these combinations and thereby provide a plurality of continuous records, each directed to control of a commercial operation (e.g., accounting, inventory, etc.).

The preferred embodiment of the present invention comprises means for accomplishing the transfer of information from a tape reading unit to storage in a computer, and is eminently suitable for employment with a computer such as described in a copending application for patent, Serial No. 325,144, filed December 10, 1952, and an automatic photoelectric tape reader such as those commonly used to sense a moving paper tape punched in conformance with a code representing decimal digital information, convert the code to binary signals intelligible to the computer and emit said signals as input to the computer.

Each cash register or accounting machine transaction, in a representative business application, is encoded to occupy an area of tape designated a "frame." Thus, for a case of this nature, a frame would comprise all information relative to one sale of merchandise or one deposit of credit into an account, etc. Additionally, the frame may be subdivided into "segments," each such segment pertaining to a class of information, such as data identifying the sales clerk or merchandise, etc. Further, a segment is often broken down into "data units," each of which comprises a combination of digits identifying one characteristic of the data, such as sales clerk number, merchandise stock number, etc. Of course, since an individual data unit is a decimal number, it would comprise one or several decimal digits, depending upon how many are required to represent the basic data. The system of the present invention is adapted to provide for a plurality of frame types and a plurality of segment types, any or all of which may be employed by a particular business to occupy a single tape. Thus, to cite examples, a retail sales establishment may require frame types to account for cash sales, credit sales, refunds, deposits, discounts, etc., produced by cash registers, and also frame types to post inventories, orders, shipments, etc., produced by accounting machines. Also, the concern contemplated by these examples, in its cash sales frame, may require clerk, merchandise, and customer segments, each bearing one or more data units of basic information.

Thus, the present invention provides means to identify a frame type among a possible random distribution of frame types on a tape and read the data in the frame into computer storage in accordance with its identity and a control found thereby.

More broadly, it is an object of this invention to identify digits being read from an original input record into a data processor according to their tenor as planned by a control pattern previously recorded in the memory of the processor.

A further object of the present invention is to provide a system of reading data into a computer which reorganizes the data as it is read into a form more appropriate than the original to ultimate use in compiling a plurality of business records.

It is a still further object of this invention to accomplish the reorganization of incoming data with a minimum of programming and attention from personnel operating the computer.

It is another object of this invention to provide a novel circuitry arrangement for automatically rendering control data stored in the memory available for identifying and assigning positions to data as it is read from the tape.

Other objects and many of the attendant advantages of this invention will become readily apparent as the same becomes better understood by reference to the preferred embodiment detailed in the following description and accompanying drawings, wherein:

Fig. 1 is a perspective view illustrating the cooperative relationship of relevant portions of the system exemplifying the present invention.

Fig. 2 shows the code pattern employed during a word period to represent a command.

Fig. 3 shows the code pattern employed during a word period to represent a number.

Fig. 4 shows a portion of the arc address channel and how the code pattern of the arc address 76 is recorded thereon.

Fig. 8 is a circuit diagram of the matrix for channel selection.

Fig. 9 is a table showing the states assumed by flip-flops L1 to L4 for channel selection.

Figs. 11a to 11e show extracts of Fig. 10 together with word descriptions and the logical equations describing each of the step operations.

Figure 5:
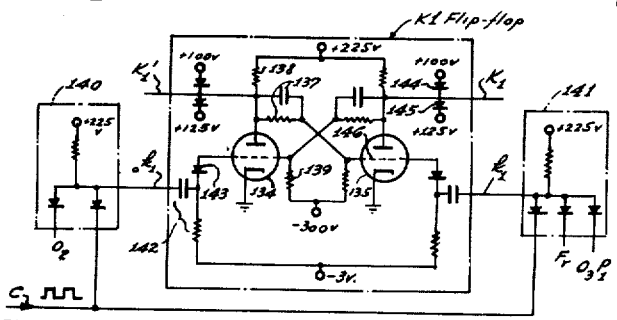
Fig. 5 is a schematic diagram of flip-flop K1.

Figs. 13a to 17b, respectively, show block diagrams of flip-flops K1, L1 to L4, and A1 to A12, together with their logical equations and triggering diode networks.

Figs. 18 to 22, respectively, show the diode networks and logical equations for propositions $E_0$, $F_0$, $J_0$, $G_0$, and $H_0$.

Fig. 23 illustrates a section of paper cash register tape containing, as an example, holes representing one frame of information to be transferred to storage in the computer.

Fig. 24 is a table depicting the arrangement of signals on lines T1 to T4 produced by the tape unit code converter corresponding to the "2 out of 7" code punched on the tape.

Fig. 25 presents an example of a control pattern arranged to handle the information on the tape shown in Fig. 23.

Fig. 26 shows the arrangement in the J buffer register of the information on the tape shown in Fig. 23.

Fig. 27 is a graph depicting part of the activity during PC#324 of the read-in routine for the example of Fig. 23.

Figs. 28 and 29 show the arrangement of the control pattern in the H register during PC#313 for the example of Fig. 23.

The invention is herein disclosed with reference to a general purpose computer operatively connected so as to control a photoelectric reader for perforated paper tape, the reader being employed as input equipment. Specifically, the invention is concerned with a computer routine which utilizes the tape reader and is known as "read-in." Thus, this specification and the accompanying drawings will describe and illustrate in detail only such portions of the computer and the tape reader as are required to explain the principle and operation of the invention, or required modification to provide therefor.

The read-in system of concern here performs broadly the following operations in accordance with a program inserted into the computer by the operator: (1) identifies a command which causes the computer to control the activity of the tape reader and, consequently, also control the emission of signals, in electrical pulse form, by the tape reader; (2) identifies the signals from the tape reader as representing information arranged on the tape to correspond with a particular one of a plurality of frame arrangements capable of being handled by the computer; (3) selects from storage in the computer memory the proper control pattern corresponding to the type of frame to be transferred; (4) operates tests on frame and segment types for correspondence with matching control pattern to provide for possible omission of one or more types of segments from the tape; (5) reads into the computer, tape signals representing one transactional frame of information, automatically assigning portions of the frame of information to positions in the computer buffer register identified by the control pattern; and (6) tests for error arising from a mismatch between segment and control pattern.

Briefly, the read-in system herein contemplated employs four one-word and one eight-word (buffer) recirculating registers of the computer, all of said registers being synchronized. Depending on the particular frame type next sensed by the tape reader as desirable of transfer, three of the one-word registers are set up, that is, filled from the memory, to contain words comprising a control pattern designed in advance by the programmer to provide for the transfer of the frame of information from the tape to the buffer register. The function of the control pattern, considered broadly, is to indicate to the computer arithmetic unit what disposition in the buffer register is to be made of information digits to be read from the tape. To accomplish this, the control pattern supplies segment identification numbers for matching with tape segment identification numbers.

In the event a particular type of segment of information has been omitted from the tape, the portion of the control pattern corresponding thereto must be rendered ineffective in the information transfer. A test in this respect is consequently made; and, if the two segment identification numbers are equal (a tape segment has not been omitted), the process of transfer of the information contained in the tape segment to the buffer register is undertaken. For this transfer, each decimal digit of every data unit in the segment is handled individually. In order to refer sequentially to control pattern information corresponding to a digit presently being handled, the control pattern is shifted in the three one-word recirculating registers in unique fashion. The shift, herein designated as "special shift," is made with the three registers arranged, with respect to the procession of binary characters therein, as a "three-word" register. Thus, by regarding the stream of control information in one of these registers, the arithmetic unit has available sequentially all of the control pattern. The control pattern information for each data unit to be transferred comprises, in order of appearance in the arithmetic unit, a P number, an N number and a J number. The P number indicates the position to be occupied in the buffer register word by the first digit of the data unit read from the tape; the N number indicates how many digits are in the data unit; and the J number indicates which of the eight buffer register words is to contain the data unit.

In transferring a segment of the frame of information, an operation is provided for the transfer of each decimal digit of the data unit or units to an intermediate one-word register and a further operation is then provided for the transfer of each data unit in the segment from that register to the buffer register. More particularly, by using the special shift to make available the P number and the N number of the first data unit, the tape is started and the first decimal digit of the data unit is set up in the intermediate one-word register. A test is then made to determine whether or not this digit is the only one of the data unit. If not, a unit is added to the P number and the next digit is set up in the intermediate register, using the new P number. Incident to transfer of a digit to the intermediate register, a unit is subtracted from the N number which is then tested to determine whether or not the digit set up is the last one of the data unit. If not, the transfer of tape digits is continued. If this test is successful, or if the test to determine whether or not the first digit is the only digit of the data unit is successful, a special shift is made of the control pattern to the J number and the digit or digits in the intermediate register are transferred to corresponding digit positions in the appropriate word of the buffer register. Thus, one data unit at a time is set up in the buffer register. Next, a test is made to determine whether or not the next digit in the control pattern is a segment identification digit. If not, it is an indication that additional data units of the segment remain to be transferred to the buffer register, and thus the transfer process is repeated. If the test is successful, it is an indication that all data units of the segment are set up in the buffer register. In this case, the entire process in which a segment is handled is again conducted, commencing with a comparison of segment identification numbers from tape and control pattern.

The contingency characterized by mismatch of the two segment identification numbers will now be discussed. As indicated, a mismatch occurs when the control pattern provides for accommodation of information not included in the transactional data. Thus, the control pattern may include a "federal tax" segment, but the article sold under a retail store sale may not be subject to this tax. It follows that, since the tape segment must be set up in the computer, a matching control pattern therefor must be found. Thus, special shifts of control pattern are made until one of two occurrences takes place. The first is a match of segment identification numbers, in which case, as already described, the segment is transferred. The second is the end of the control pattern, in which case a new control pattern is tested for and, if found, placed in the three one-word registers and the entire transfer process is repeated. If no additional control pattern has been provided, a test is made to determine whether or not an entire frame has been transferred. If not, the computer automatically sequences to a routine which indicates error. Generally, the error is one of programming, since the control pattern had not provided for the handling of an entire frame. If, however, no such error has been made, the computer sequences to the "rest" condition, from whence it executes the next command in its program.

A presentation of further details of this system will be given later in connection with a discussion of Figs. 10 and 11a to 11e.

GENERAL DESCRIPTION OF THE COMPUTER SYSTEM

Referring first to Fig. 1, a perspective view is shown of a computer with provision for the preferred embodiment of the invention.

Here is shown memory drum 101 having a magnetizable surface 106. Drum 101 is rotated, in a clockwise direction, by motor 102. Adjoining surface 106, and stationarily positioned so as to be capable of recording thereon information in the form of binary magnetic patterns or receiving information in the form of voltages induced by such patterns as are already established, are magnetic sensing elements, such as heads 107, 112, 126, etc., which, as drum 101 revolves, define circumferential channels thereupon.

Clock channel 108 completely circumscribes drum 101 and contains a permanently recorded magnetic flux pattern representing an electrical sine wave so as to form a timing signal track, the sine wave cycles of which divide the drum circumference of the present embodiment into 2688 elemental areas. Head 107 senses the changes in magnetic flux pattern on clock channel 108, thereby generating an electrical signal indicative of each sine wave cycle. The electrical signal is shaped to a symmetrical square waveform preliminary to causing it to serve as driving voltage for other components. Circuitry for this purpose (not shown) is well known in the art, and generally comprises several stages of amplification, a pulse shaping network, a triggering circuit of the Schmitt type and a diode clamping arrangement. The resulting square wave, hereinafter designated as signal C, has a period equal to that of the original sine wave and an amplitude clamped between +100 v. D.C. and +125 v. D.C. The time period between trailing edges of signal C will be designated as a clock period, and a differentiated signal generated by the abrupt fall of the trailing edge of signal C is employed to trigger the logical circuitry of the computer. It may be noted that signal C is also used to synchronize logical networks of the computer and it should be understood that all logical propositions in the computer operate at the same two voltage levels as signal C, i.e., +100 v. D.C. and +125 v. D.C.

It is by utilizing signal C as a reference during reading and recording that the other circumferential channels of drum 101 are divided into a similar number of elemental memory areas. Each of these memory areas in the other channels shown in Fig. 1, namely, arc address channel 109 and storage channels 118, is capable of containing a digit of binary information, i.e., a saturated flux pattern either in one direction or the other. When the flux is in one direction in a given elemental memory area, a binary digit "one" is represented; when it is in the other direction, a binary digit "zero" is represented.

Computer components are designed to serially handle information in groups consisting of a fixed number of binary digits. These groups may represents either commands or numbers and are commonly referred to as "words." A word is comprised of a sequence of 42 consecutive binary digits. The portion or arc of a circumferential channel in which a word may be recorded is designated a storage register. Since clock channel 108 contains 2688 sine wave cycles, storage registers for 64 words (2688/42) are provided on each of the channels. Thus the circumference of drum 101 is divided into 64 arcuate portions, as partly shown on the end of drum 101, consecutively arranged such that the entire circumference of the drum is covered. The time required for one storage register to pass a head is designated as one word period, and is defined by 42 cycles of the sine wave passing head 107 of clock channel 108.

Counting circuits 117 are provided for counting the clock pulses generated by head 107 and its associated circuitry. This counter responds to a cycle of 42 clock pulses. Thus the overall counting cycle defines the period allotted to a storage register on the drum. Counting circuits 117 respond directly to the signals induced in head 107 and have an output corresponding to each of three successive clock pulse counts, namely, $P_0$, $P_1$, and $P_2$, and an output corresponding to each group of three clock pulse counts, namely, $O_0$, $O_1 \ldots O_{13}$. Thus, since the "P" counts are considered as binary counts, the "O" counts may be thought of as defining octal digits. This arrangement thereby divides each storage register into 14 octal digit periods and each octal digit period into three binary digit positions. Accordingly, by noting the P and O counts together, succeeding elemental memory areas on the arc corresponding to a storage register, hereinafter to be designated "binary digit positions" or "pulse positions," are identified as $O_0P_0$, $O_0P_1$, $O_0P_2$, $O_1P_0$ . . . $O_{13}P_2$. In summary, each word period is divided by this arrangement into fourteen O (octal) periods, each of which is subdivided into three P (binary) positions and in each of the latter may be stored one binary digit. Thus, by noting the outputs of counting circuits 117, the pulse position in an arc presently being scanned by the heads on drum 101 can be observed.

The configuration of computer words will next be discussed as preliminary to a description of the other channels of drum 101.

Referring to Fig. 2, a diagram showing the serial arrangement in a word period of information will be described. The word period of 42 clock periods is shown to be divided into 14 equal octal digit periods, $O_0$ through $O_{13}$, respectively. Each of these octal periods is further divided into three binary digit positions marked $P_0$, $P_1$, $P_2$.

In Fig. 2, the specific word arrangement shown is the representation of a command capable of execution by the computer. The information in a command comprises a coded instruction, occupying period $O_{12-13}$, and other relevant information, usually addresses of storage registers in the memory. With respect to the present invention, the instruction code is employed in sequencing the computer to execute a routine which reads-in decimal information arranged as output signals from a set of four lines to be discussed later, and the other information comprises the address of a storage register designated as the "base address." The base address refers to a storage register, the information in which is used during the execution of the command to make available the control pattern.

Fig. 3 shows the serial arrangement in a word period of information representing a number. It can be seen that the computer provides for operating on decimal numbers 9 digits in length (36 binary digits or 12 octal digits), accompanied by codes representing the sign of the number and whether or not the number is accompanied by an overflow condition.

Referring next to Fig. 4, a diagram of a portion of arc address channel 109 (Fig. 1), defining in particular arc 76, is shown. In periods $O_{0-1}$, $O_{4-5}$, and $O_{8-9}$ of each of the arcs in arc address channel 109, signals, corresponding to the binary number indication of the address of the next arc to pass heads 127 of storage channels 118, are permanently recorded. Additionally, in period $O_{12}$ of each arc, signals corresponding to the binary number indication of the octal units digit of the arc address are recorded. As will be detailed later, the binary digits read from arc address channel 109 are serially set up in flip-flop M$w$. It should be noted that the details of the circuitry for serially triggering flip-flop M$w$, in accordance with the magnetic pattern on arc address channel 109, has already been disclosed to the art. Briefly, the binary square wave pattern impressed in arc address channel 109 (Fig. 1) is sensed by head 126 and, due to differentiation thereby, presents pulses representing the leading and trailing edges of the square wave. These pulses are amplified, clipped, clamped between the limits +100 v. D.C. and +125 v. D.C., and applied to the grid input circuits of flip-flop M$w$ through diode gates such that the leading-edge pulse triggers flip-flop M$w$ into one state and the trailing-edge pulse triggers flip-flop M$w$ into the opposite state. The grid input circuit diode gates of flip-flop M$w$ are synchronized with clock pulses by application of signal C. These concepts will be further clarified later in connection with the convention adopted to present the computer logic. The output of flip-flop M$w$ provides one of the inputs to arithmetic unit 114, as will also be shown hereinafter.

Returning now to Fig. 1, next in order on drum 101 are 16 storage channels 118, each of which is equipped with a head 127, used for both reading and recording. Communication of information between heads 127 and arithmetic unit 114 is controlled by gating circuits 167, which receive a selective signal on line 123 from arithmetic unit 114 (flip-flops L1 and L4) to permit only one storage channel to communicate with arithmetic unit 114 at a time via lines 128a and 128b.

During the reading process, information from a selected storage channel is serially set up in flip-flop M1 which operates to feed it into arithmetic unit 114 in accordance with techniques such as those described in the reference application, Serial No. 325,144.

Referring to the recirculating registers E, F, G, and H, it is noted that each of these recirculating registers has two heads associated with the drum memory, one for reading and the other for recording, arranged such that as drum 101 rotates, a portion of the drum surface will pass the record head first and the read head later. For example, the E register includes record head 112 spaced along the drum surface from read head 113. Thus, as far as the recirculating registers are concerned, only a small arcuate portion of the drum surface is used for storing information at a given time. This portion occupies an area equivalent to less than 42 elemental memory areas, and the information is delayed in arithmetic unit 114, regardless of whether or not it is modified, a given number of clock periods so that the normal recirculating time for each of these registers is one word period. The recirculating registers have their heads interconnected by way of arithmetic unit 114 so that, for example, when the computer circuitry is set for recirculation in a register, a particular binary digit signal on being recorded on the drum surface by the record head will be carried by drum 101 to the read head, sensed thereby, transmitted to arithmetic unit 114 wherein the signal steps through flip-flop circuits, and is then retransmitted to the record head by which it is again recorded. Thus, it is noted that information recirculating in these registers is stored dynamically in that the moving arc serves as a medium for temporarily delaying information recorded thereon so that it can be picked up a fixed period later.

From Fig. 1 it may be seen that the J buffer register is also a recirculating register similar to those already discussed, but with the exception that the arcuate portion of drum 101 employed is larger. Thus, provision is made for the recirculation of eight words.

For purposes of identification, specific words of the J buffer register are considered to be numbered from 0 to 7 in accordance with the octal units digit of the arc addresses recorded in arc address channel 109.

It should be noted that the circuitry in control of the recirculating registers is well understood. Briefly, for the E register, for instance, the output of arithmetic unit 114, designated as proposition $E_0$, is a square wave clamped between +100 v. D.C. and +125 v. D.C., and is fed to the gating circuit of one grid of flip-flop E$r$. Proposition $E_0$ is also inverted and fed as proposition $E_0'$ (not shown) to the gating circuit of the other grid of flip-flop E$r$. Both grid gates are synchronized by signal C and the outputs, $E_r$ and $E_r'$, of flip-flop E$r$, represented by line 129, are employed to energize record head 112. Information picked up from drum 101 by read head 113 is fed through a chain of flip-flops E1 to E5, such that the binary values represented by the consecutive conduction states of a flip-flop in the chain are successively transferred into the next flip-flop of the chain at every fall of signal C. These flip-flops serve to give the recirculating register a degree of flexibility in that information can also be routed directly from them into arithmetic unit 114. An example of such a connection, operating in the E register, is provided by line 116 which routes the outputs of flip-flop E1, namely, $E_1$ and $E_1'$, into arithmetic unit 114. Thus, information in flip-flop E1 is presented to arithmetic unit 114 four clock periods earlier than it is presented by flip-flop E5.

As will be subsequently indicated, the rest of the flip-flops shown in Fig. 1, namely, K1, A1 to A12, and L1 to L4, are arranged by arithmetic unit 114 to serve a plurality of purposes. Briefly, however, it may be pointed out that the primary function of flip-flop K1 is to signal program counter 115 at the end of each word period to "count" to its next higher number, "skip" to a new number, or "stick" in the same number. Also, flip-flops A1 to A4 primarily function to store a decimal digit read from the tape. Additionally, flip-flops L1 to L4 generally function in cooperation with a channel selection matrix to open gating circuits 167 to select a storage channel. Further details with reference to these flip-flops and flip-flops A5 to A12 will be presented later.

Fig. 1 also indicates that information is received by arithmetic unit 114 in the form of signals on lines T1 to T4 and signal $F_r$ on line 180 from tape reader 181. Furthermore, an energizing signal is transmitted by the computer over line 182 to motor 189 of tape reader 181.

In the present computer, the processes performed are divided into sequential operations, each definable within a time period of one word length. It is the function of program counter 115 to render certain networks operable during each word period so as to accomplish each of these step operations. Accordingly, each output count signal #0, #1, etc. of program counter 115 renders operable certain circuits of arithmetic unit 114 which are thus enabled to respond to its inputs during each of the 42 clock periods of a word to generate the desired output propositions.

Figure 10:
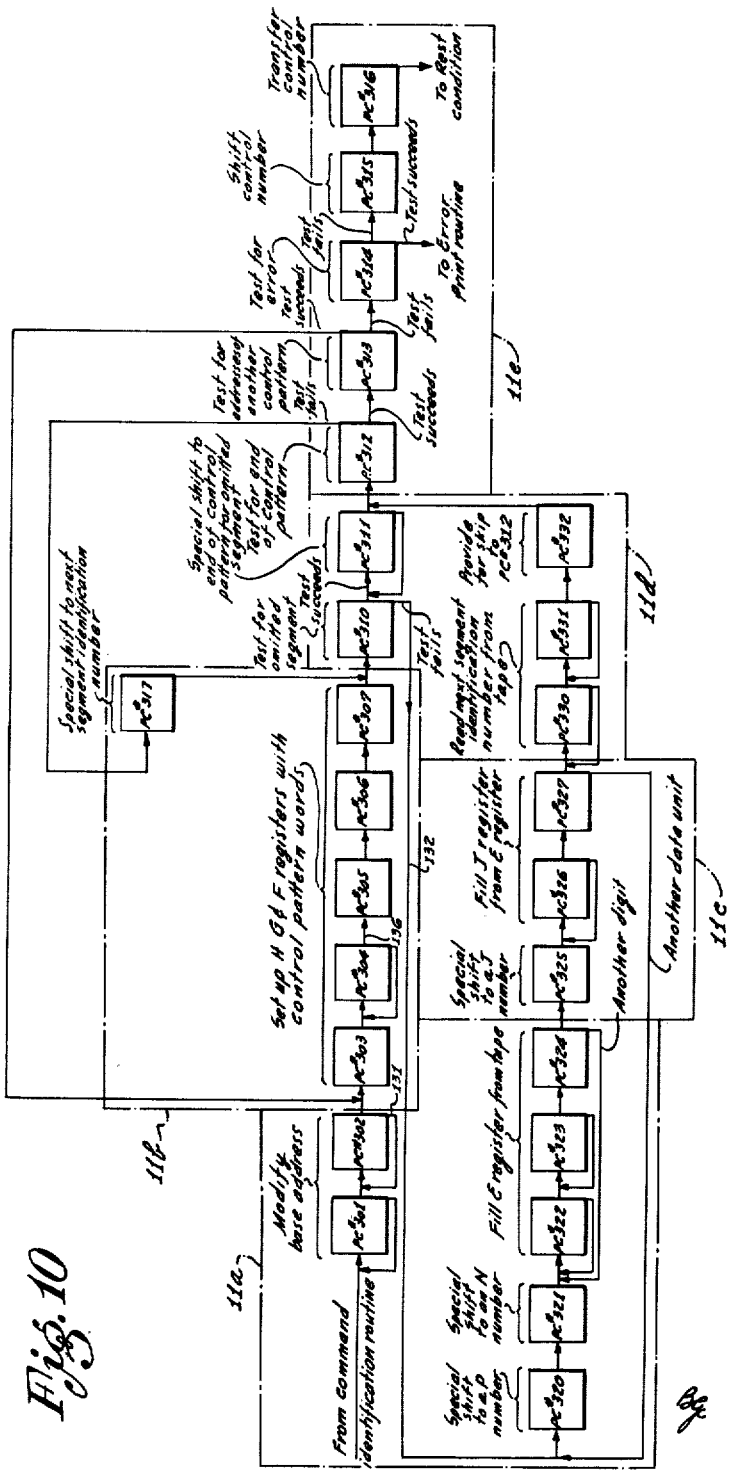
Fig. 10 is an extract from the computer functional flow diagram showing the step operations comprising the input system of the present invention.

The content of program counter 115 is subject to being changed precisely at the end of each word period, as directed by the state of flip-flop K1 during the last binary digit position ($O_{13}P_2$) of each word period, to cause other circuits to become operable during the next word period. Thus Fig. 1 shows that program counter 115 feeds its outputs into arithmetic unit 114 and is in turn controlled by output 130 (from flip-flop K1). Reference to Fig. 10 will clarify the action of program counter 115. This figure presents the portion of the computer flow diagram relevant to reading in information originating on a tape and shows how the step operations are arranged in sequence to accomplish this routine when the coded command "read-in from tape reader," programmed into the computer by the operator, is being executed. As noted in Fig. 10, each of the step operations is represented in the flow diagram by a block identified by a number, such as PC#301, corresponding to an output of program counter 115. Each such block represents diagrammatically a set of logical operations to be performed serially on information passing through arithmetic unit 114 during a single word period. The flow diagram extract shows the sequence in which program counter 115 changes in content, thus automatically directing the order in which the one-word step operations are performed by the computer. Generally, program counter 115 increases in content or "counts" (octally in this computer) in an orderly fashion as the one-word operations are sequenced from left to right on the flow diagram; an example is horizontal progression or output 136 from PC#304 to PC#305 in Fig. 10. However, program counter 115 may have the same number content for more than one word period, i.e., program counter 115 may "stick" in a given number as indicated, for instance, by a vertical output such as that represented by line 131 associated with PC#302. Furthermore, program counter 115 may "skip" from one PC# to another, as indicated, for example, when it skips from PC#310 to PC#320 via the output represented by line 132.

It is the state of flip-flop K1 at pulse position $O_{13}P_2$ of a word period that determines which of the two courses (horizontal or vertical) program counter 115 will follow when signal C falls at the end of pulse position $O_{13}P_2$. In the present computer, if flip-flop K1 is false at $O_{13}P_2$, program counter 115 will count; if flip-flop K1 is true at $O_{13}P_2$, program counter 115 will stick or skip. The state of flip-flop K1 at $O_{13}P_2$ is the result of a number of conditional processes, one of which occurs during every word period and which will be presented for each word period.

Before considering further features of the computer circuitry concerned with the present invention, the preferred type of flip-flop circuit and nomenclature attached thereto will be broadly outlined.

Logical propositions may be considered to be represented in circuitry by the states assumed by flip-flop circuits having two input lines and two output lines, as illustrated by the arrangement of Fig. 5. This circuit, designated as flip-flop K1, utilizes a pair of triode tubes, such as tube 134 and tube 135, the conduction in which is controlled by gating circuits, such as 140 and 141, respectively. When the flip-flop is in the condition such that tube 135 is cut off and tube 134 is conducting, output $K_1$ from tube 135 is clamped at $+125$ v. D.C., output $K_1'$ from tube 134 is clamped at $+100$ v. D.C., and the flip-flop is said to be true. When the flip-flop is in its other condition wherein tube 135 is conducting and tube 134 is cut off, output $K_1'$ is high in voltage, output $K_1$ is low and the flip-flop is said to be false. In order to trigger the flip-flop, signals in the form of negative-going pulses, the source of which is signal C, are applied on separate input lines coupled to the grids of the flip-flop tubes in accordance with the convention that input $k_1$ must be at $+125$ v. D.C. in order to pulse and cut off tube 135 and make output $K_1$ high, and that input $_0k_1$ must be at $+125$ v. D.C. in order to pulse and cut off tube 134 and make output $K_1'$ high.

Describing the circuit of flip-flop K1 of Fig. 5 in greater detail, as shown, triodes 134 and 135 are arranged such that the plate of each is intercoupled to the grid of the other by a resistor-capacitor combination, such as 137. Each plate is provided with a load resistor, such as 138, prior to connection to $+225$ v. D.C.; each grid is provided with a resistor, such as 139, prior to connection to $-300$ v. D.C.; and each cathode is grounded. The inputs to the grids of triodes 134 and 135 are from gating circuits 140 and 141, respectively, during, for instance, PC#302 of Fig. 10. The gating circuit outputs are differentiated and clipped by networks, such as 142, and diodes, such as 143, so that negative pulses only are applied to the grids of the triodes. The output from each triode is from the plate and is clamped between $+100$ v. D.C. and $+125$ v. D.C. by diodes, such as 144 and 145.

If, for example, flip-flop K1 is false, a negative pulse applied to grid 146 will cut triode 135 off, thereby causing output $K_1$ to be high. This pulse is provided by an output from gate 141 (i.e., all of the input signals representative of terms $F_r$, $O_3P_1$, and C simultaneously at the high potential of $+125$ v. D.C.). At the end of the pulse period, signal C will abruptly drop to the potential $+100$ v. D.C., which change, after differentiation, will produce the requisite negative-going trigger. It follows that flip-flop K1 will be in a true state at pulse position $O_3P_2$. It should be noted that, if flip-flop K1 were already true at $O_3P_1$, triode 135 would already be cut off and the negative pulse supplied by gate 141 would have no effect. In this case, the only way to change the state of flip-flop K1 would be to pulse the grid of triode 134 by providing an output from gate 140.

Figure 6:
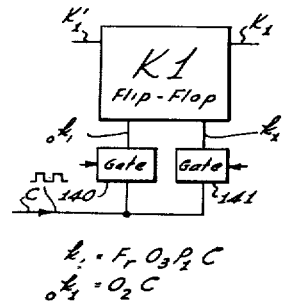
Fig. 6 is a block diagram of flip-flop K1 together with the logical equations defining its operation during PC#302.

For the presentation of other flip-flop circuits, resort will be made to block diagrams to represent the schematic form, as illustrated by Fig. 6 for flip-flop K1, and the Boolean equations and diode networks which define when and how the flip-flop circuit is to change will be shown with the block diagram.

Figure 7:
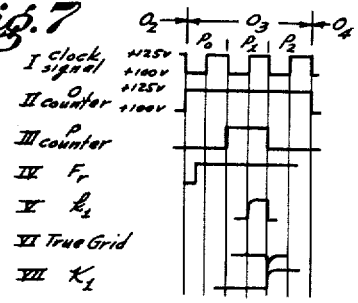
Fig. 7 is a graph of the waveforms concerned with the $k_1$ triggering equation during PC#302.
Figure 13A:
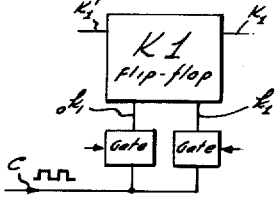
Figure 12:
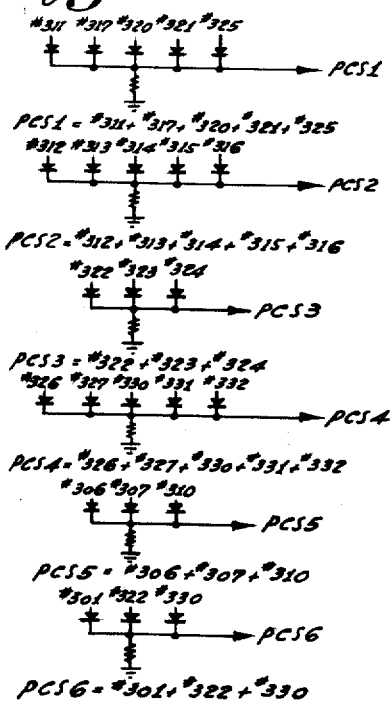
Fig. 12 shows the diode networks provided for generating the program counter sum logical propositions which render the required networks of the arithmetic unit effective.

The action of flip-flop K1 in accordance with the equation shown will be further explained by the waveforms of Fig. 7. These graphs show how flip-flop K1 is triggered true from a prior false condition during period $O_3$ as the result of the equation $k_1 = F_r O_3 P_1 C$ (Fig. 6). Line I represents signal C. Lines II and III show the output of counting circuits 117, which defines pulse position $O_3 P_1$, at which arithmetic unit 114 is arranged by program counter 115 to make flip-flop K1 responsive to clock signal trigger pulses which will take effect provided a signal $F_r$, received from tape reader 181, is high. In line IV this provision is shown to be met starting at $O_3 P_0$. It is thus at $O_3 P_1$ only that an effective true input $k_1$ (line V) will be generated. However, flip-flop K1 will be triggered true only by a negative-going pulse applied to its true grid. This pulse occurs, as shown in line VI, when the $k_1$ input sharply drops to a low potential at the end of $O_3 P_1$ due to the fall of signal C. Thus, as line VII shows, the output $K_1$ swings to a high potential at $O_3 P_2$. It is noted that flip-flop K1 will remain in the true state until triggered in accordance with the $_0 k_1$ equation of Fig. 6.

Figure 13B:
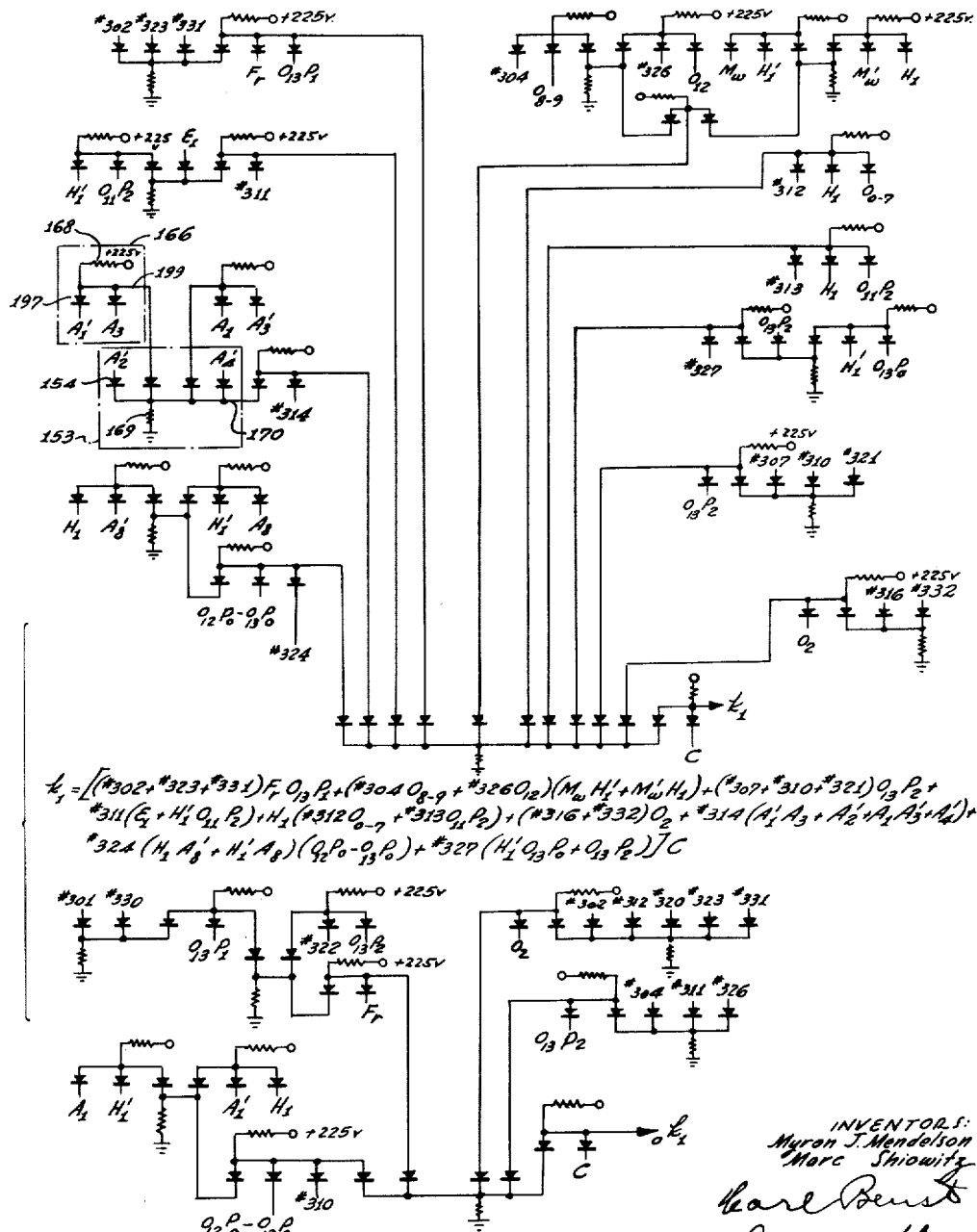
Figure 14A:
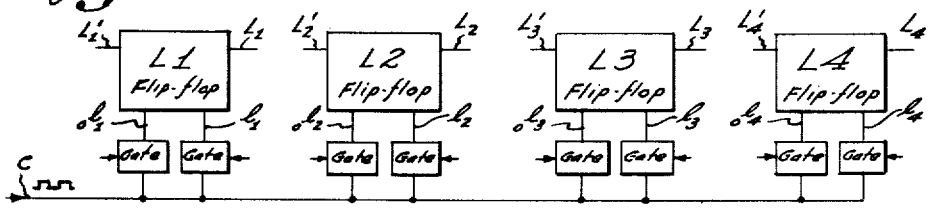
Figure 14B:
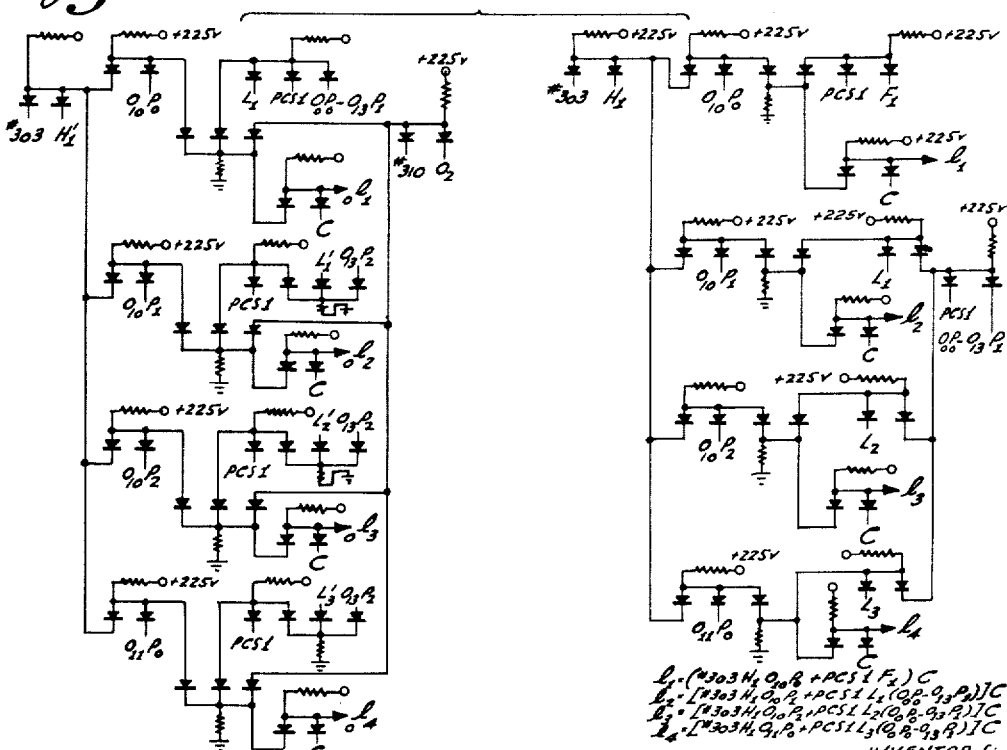
Figure 17A:
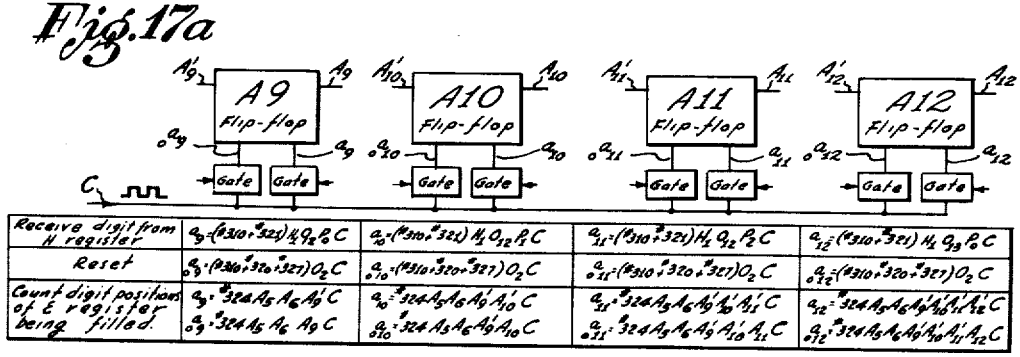
Figure 17B:
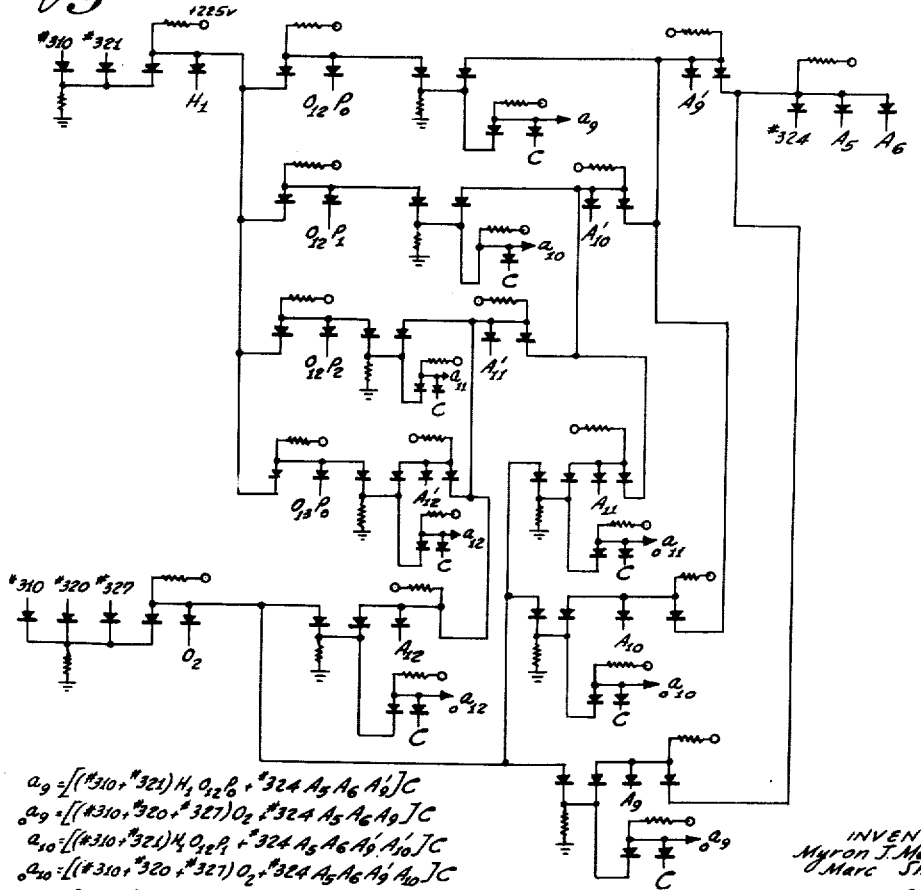
Figure 18:
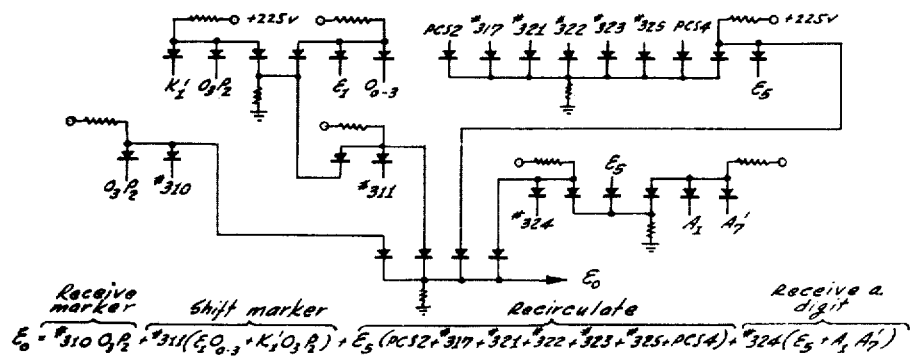
Figure 19:
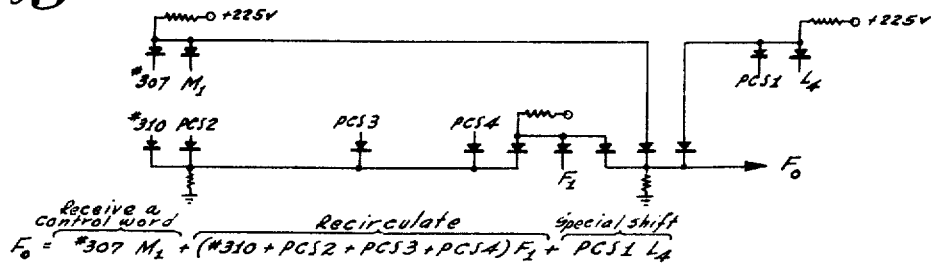
Figure 20:
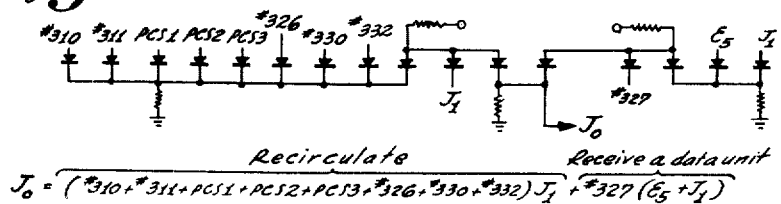

Logical product and sum networks (gates and mixers, respectively) are illustrated in Fig. 13b, which shows, for the present invention, the complete triggering equations and circuitry for flip-flop K1. Thus, for example, the equation effective during PC#311:

$$k_1 = (E_1 + H_1' O_{11} P_2) C$$

is interpreted as meaning that flip-flop K1 will be triggered into the true state at the end of the clock period during which the term $E_1$ or the term $H_1' O_{11} P_2$ is at a high potential (logical addition), where the term $H_1' O_{11} P_2$ itself will be at a high potential whenever the terms $H_1'$ and $O_{11} P_2$ are at a high potential (logical multiplication).

Thus, in Fig. 13b, the portion of the diode network enclosed within block 166 is a typical gate network. In such a circuit, signals having voltage levels of either +100 v. or +125 v. are obtained from the sources indicated and applied on the cathode-ends of crystal diodes, such as 197, whose anode-ends are joined to common line 199 connected to positive source +225 v. through product resistor 168.

Any time all the diode input signals to gate 166 are at the high potential of +125 v., the output on line 199 swings to this high potential. If any one of the input signals is at the low potential of +100 v., the output on line 199 is at this low potential.

Output line 199 is connected as one of the inputs of a typical mixer network, enclosed within block 153. Mixer 153 is comprised of input diodes, such as 154, whose cathode-ends are joined to common line 170 and returned to ground through sum resistor 169. The input signals to this circuit are applied on the anode-ends of the diodes. Whenever any one of the inputs to mixer 153 is at the high potential of +125 v., the output on line 170 is at this high potential.

It is also evident that gate 166 and mixer 153 are interconnected with other gates and mixers to form a large diode network, whose output, namely, term $k_1$, drives a grid of flip-flop K1.

The tape reader contemplated for cooperation with the read-in system of the invention is, as mentioned, photoelectric in operation. Briefly, from Fig. 1, it is seen that tape reader 181 comprises tape feed mechanism 183, controlled by the computer on line 182, for transporting a continuous paper tape 184. Optical projection system 185, of the "pinhole" type, throws an image of the filament of projection lamp 186 onto the sensitive surfaces of eight photocells 187 stationed opposite lamp 186, said images being received when holes are positioned between lamp 186 and photocells 187.

The form of paper tape 184 is well known in that it is provided with columns and rows of perforating positions, as illustrated by the specific example presented in Fig. 23. As indicated, there are eight columns, namely, a timing column along one side of the tape, and seven information columns. On the area of tape recorded with information, the timing column contains a continuous series of holes evenly spaced to identify rows in which the information may be recorded. A decimal digit of information is punched in a row as holes in two of the seven information columns in accordance with the code shown in the chart of Fig. 24. It is to be noted that the last two codes in this figure do not represent decimal digits of information, but rather are the codes for "frame symbol" and "run-in symbol." As will be further discussed at a later time, the former of these codes is employed as an indication to the computer of separation of frames on the tape while the latter of these codes signals the computer that the beginning of information has not yet been reached on the tape.

It is the function of code converter 188 (Fig. 1) to receive the outputs of photocells 187 and convert them to the electrical pulse form characterized by the two voltage levels +100 v. D.C. and +125 v. D.C. at which the computer operates. The output of code converter 188, corresponding to holes in the timing column of tape 184, is generated on line 180 and is designated as signal $F_r$, which, it follows, is at +100 v. D.C. when a hole is sensed and at +125 v. D.C. between holes. The outputs of code converter 188 corresponding to the seven information columns of tape 184 are generated on lines T1 to T4 and are designated as signals $T_1$ to $T_4$. It follows that signals $T_1$ to $T_4$ are at +125 v. D.C., which corresponds to a binary 1, only when holes are sensed in the information columns in accordance with the table of Fig. 24, otherwise these signals are at +100 v. D.C., corresponding to a binary 0.

DETAILED DESCRIPTION OF THE INVENTION

More particular reference will next be made to Figs. 11a to 11e, which, when considered together, show the extract of the computer flow diagram relative to the read-in routine of the present invention. It is to be noted that Fig. 10 also presents this routine and may be consulted when an overall picture thereof is desired.

*Initial operating data and control pattern*

The information found in the H register prior to entering the read-in routine is the command shown in Fig. 2, and comprises, in period $O_{12-13}$, the code characterizing the instruction "read-in from tape reader"; and in period $O_{8-11}$, a "base address." The operation of the computer in identifying a command and sequencing the computer operations for the execution of the command is considered to be well known. The base address is employed during the read-in routine, as will be shown, in picking up from the memory the control pattern relevant to the frame to be read from the tape. With reference to the read-in routine, other information in the H register is irrelevant.

For the discussion of Figs. 11a to 11e that follows, it is expedient to make certain assumptions. Thus, it will be assumed that the computer is storing initial operating data in its memory in storage registers, the addresses of which are known to the programmer, as well as continuously recirculating the command of Fig. 2 in the H register, once each word period. A further assumption is that, prior to entering the read-in routine of Figs. 11a to 11e, all computer flip-flops have been set false with the exception of flip-flop K1.

The nature of the initial operating data stored in the memory will next be discussed. This operating data comprises a plurality of control patterns, each of which, as mentioned, prescribes the manner in which a particular frame of tape information is to be distributed to the J buffer register. Every frame is composed of a predetermined sequence of segments, and the programmer may freely establish the number of data units in a segment and where each data unit is to be stored in the J buffer register. These selections necessitate the specification of the three control digits already defined, namely, the P, N, and J numbers, as well as the segment identification numbers for each segment. This control information, for the entire frame, is set up as a control pattern in a group of three consecutive storage registers of the memory; and, if additional storage is required for the control information of a frame, other groups of three consecutive storage registers are employed. The address of the first such control word in the first group of a pattern is specified in period $O_{8-11}$ of the H register and is designated as the base address. The address of the first control word in the second, or any subsequent group of a pattern is specified in the third (last) control word of the preceding group. The addresses of succeeding control words after the first in each group are sequential and need not be specified since, as will be shown, lookup for these addresses in the memory is automatic. It may be noted from Fig. 2 that the base address, as originally set up, is required to be such that zeros occupy period $O_8P_2$—$O_9P_2$. Reasons therefor will become apparent at a later time. The stream of control information for each segment which feeds into arithmetic unit 114 as a result of the control pattern comprises, in sequence, the segment identification number and the P, N, and J numbers for each data unit in order. These are binary coded decimal digits and are followed by four binary coded octal digits comprising an address. This address locates the next control pattern when a plurality are required or the next command to be executed by the computer.

Referring to Fig. 11a, the operation of PC#s301 and 302 is to modify the base address recirculating in the H register. This operation replaces the zeros in period $O_8P_2$—$O_9P_2$ of the base address with the first decimal digit read from the tape. This decimal digit is the frame identification number. It is to be noted that the tape reader, when controlled by the computer, functions such that the tape is automatically advanced to and stops at holes representing the first decimal digit recognizable by the computer, in this case, the frame identification number. It will also be recalled that provision is made for the use by a business establishment, of a plurality of frame and segment types, represented by different codes emitted by the tape reader. These codes conform to Fig. 24.

It is obvious that each frame type to be read from the tape must be provided with a corresponding control pattern stored in the memory. Thus, by modifying the base address in the H register with the code for the frame type to be next read, a new address is set up, and this address is programmed to correspond with the first control word to be used for the frame. In this way, as reading of a frame of data is commenced, the proper control pattern for distributing the data of that frame in the J register is brought into effect. An example of this system is presented in Table I.

TABLE I

|  | Base Address 1503 | | |
| --- | --- | --- | --- |
|  | FI #0 | FI #2 | FI #9 |
| First group of control words: | | | |
| Address of 1st control word (specified in command) | 1503 | 1513 | 1547 |
| Address of 2nd control word | 1504 | 1514 | 1550 |
| Address of 3rd control word | 1505 | 1515 | 1551 |
| Second group of control words: | | | |
| Address of 4th control word (specified in 3rd control word) |  | 1521 |  |
| Address of 5th control word |  | 1522 |  |
| Address of 6th control word |  | 1523 |  |

It is to be noted that this system of programming control data is equivalent to locating the address of the first control word of the control pattern corresponding to each of the frames by multiplying the decimal equivalent of the frame identification number by "four," and expressing the result as an octal number which is added to the base address. The addresses of the remaining two words of the control pattern, of course, sequentially follow the first in being sensed from the memory.

Referring next specifically to PC#301 of Fig. 11a, it is noted that the first statement refers to activating tape reader 181 to start the motion of tape 184. As mentioned in connection with Fig. 1, the computer controls the motion of tape 184 via line 182. Line 182 carries energizing potential for motor 189 as directed by the output of program counter 115, a system well known in the art as program counter control. Thus, the output "PC#301" causes motion of the tape. It will be noted, however, that due to the inherent speed of the computer, the other operations of PC#301 are performed before the tape can start moving. It will also be noted that the activity of PC#301 is repeated each word period since this is a "stick" word time block. In other words, the computer repeats the procedures called for or defined by PC#301 until the tape motion causes the transmission of signal $F_r$, which by means of the equation $_0k_1 = F_r O_{13} P_1 C$ causes flip-flop K1 to be false at pulse position $O_{13}P_2$, at which time the computer enters PC#302. It should thus be obvious that signal $F_r$ is at the potential of +100 v. D.C. when a timing hole is being sensed by the tape reader, but is at the potential of +125 v. D.C. between timing holes.

Also during PC#301, by means of the equation $H_0 = H_1$, the base address is recirculated once each word period; and, by means of the $a_1$ to $a_4$ equations, flip-flops A1 to A4 are set up with the frame identification number carried on lines T1 to T4, respectively. It is seen that the least significant binary digit of the frame identification number, carried on line T1, is set up in flip-flop A1 and the other binary digits, in order, are set up in flip-flops A2 to A4 with the latter containing the most significant binary digit.

It is to be noted that, in the present system, the frame identification number is immediately followed, on the tape, by the digits of the data units of the first segment of the frame of data. Thus, the frame identification number serves also as the segment identification number of the frame's first segment. This provision, of course, is considered by the programmer in arranging the control pattern.

In PC#302, the tape is stopped at the next coded digit but, prior thereto, the frame identification number in flip-flops A1 to A4 is set up in the H register during period $O_8P_2$—$O_9P_2$, thereby completing the address of the first control word of the control pattern corresponding to this frame identification number. It is noted from the equations controlling flip-flop K1 that the computer sticks in PC#302 as long as signal $F_r$ is present to set flip-flop K1 true subsequent to having been preset to the false state, i.e., as long as no timing hole is sensed by the tape reader. When a timing hole is again sensed, K1 remains in the false state and the computer progresses to PC#303.

Figure 11B:
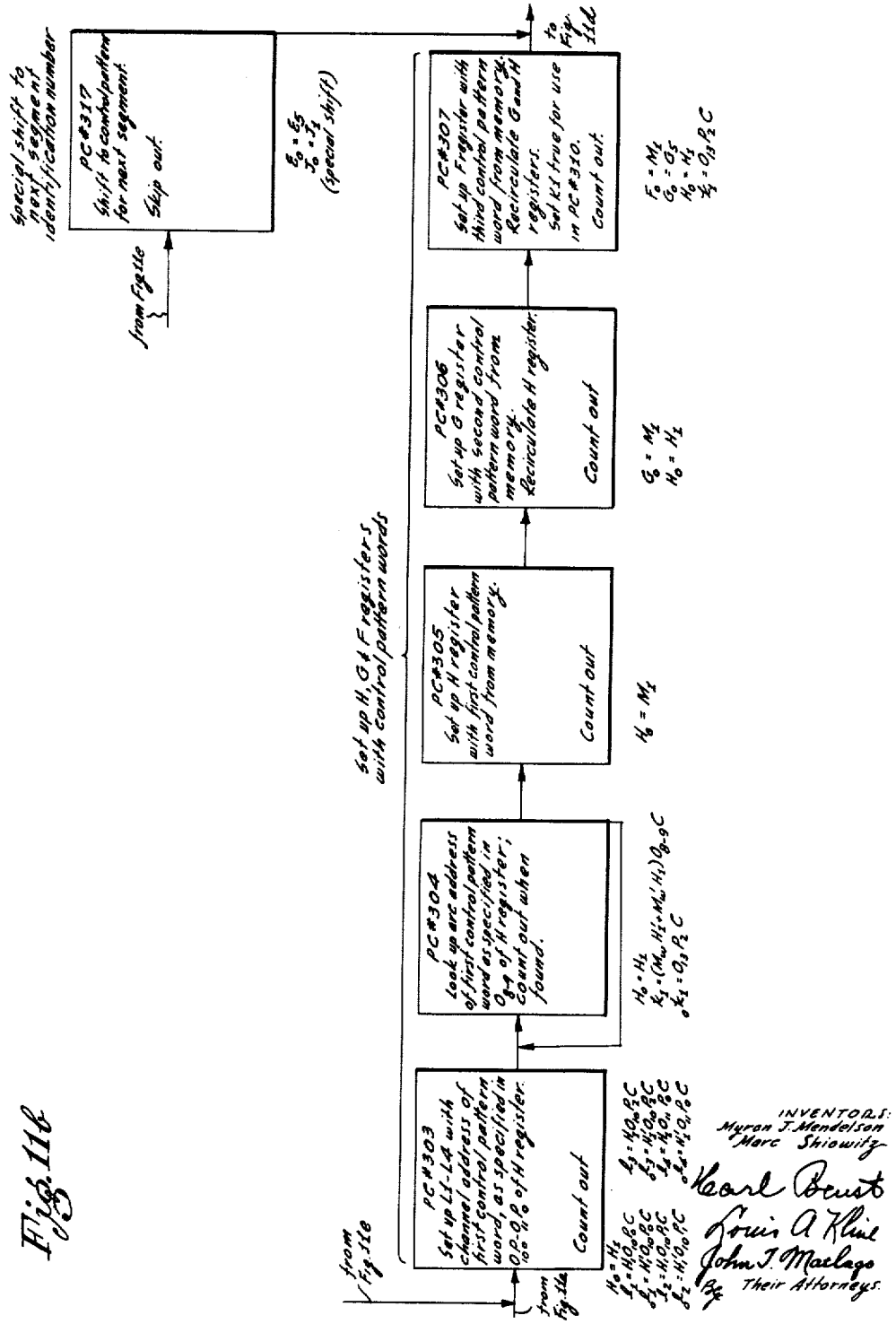

During PC#s 303 to 307, as shown in Fig. 11b, the addresses of the control pattern words are looked up in the memory and the words are routed into the H, G, and F registers, respectively, in that order.

It is noted that entry to PC#303 is from PC#302 or via a skip from PC#313. As will be shown at a later time, the path from PC#313 is followed when a test therein indicates that a frame of information requires, for proper transfer, a control pattern comprising a plurality of groups of control words. Thus, entry into PC#303 is made from PC#302 for the first group of control words, and from PC#313 for subsequent groups.

In PC#303, channel selector flip-flops L1 to L4 are set up according to the respective equations to define the channel address of the modified base address contained in period $O_{10-11}$ of the H register. The arrangement of these flip-flops causes a signal on line 123 (Fig. 1) of arithmetic unit 114 to actuate gating circuits 167 so as to operatively connect flip-flop M1 to follow the output of the head on the selected channel. Referring to Fig. 9, a table shows the true and false states combinations of flip-flops L1 to L4 which define and control the selection of one output from among the storage channels 118, while Fig. 8 shows a diode matrix which reduces the L1 to L4 outputs to a single channel-selecting signal.

Thus note that output $Ch1$ in Fig. 8 is connected to line 121 to which flip-flop outputs $L_1$, $L_2'$, $L_3'$, and $L_4'$ are connected by diodes, such as diode 122. A +225 v. D.C. source is also connected to line 121 through resistor 124. The operation of this circuit is such that only when all of the above specified flip-flop outputs are at the +125 v. D.C. potential is the output $Ch1$ at this potential. Simultaneously, the outputs corresponding to the other storage channels will be at the potential of +100 v. D.C.

Since flip-flop K1 remains false throughout PC#303, a count to PC#304 is made after one word period.

During PC#304, the arc address of the modified base address in period $O_{8-9}$ of the H register (as it steps in flip-flop H1) is tested against the arc addresses of arc address channel 109 (stepping in flip-flop $M_w$) and flip-flop K1 is set true each time the test fails. This operation is logically represented by the equation $$k_1 = (M_w H_1' + M_w' H_1) O_{8-9} C$$

Thus, by comparing the output of flip-flop H1 with that of flip-flop $M_w$, the state of flip-flop K1 at $O_{13}P_2$ of each word period will indicate the result of the test. Note that the above equation states that flip-flop K1 is set true whenever the comparison fails, causing the computer to repeat the operations of PC#304. The equation $_0k_1 = O_{13}P_2 C$ is provided to cause flip-flop K1 to be false prior to making the test. Thus, at the end of the word period during which the proper arc is read, as indicated by the $k_1$ equation not being satisfied, flip-flop K1 remains false. Therefore, program counter 115 counts and advances the routine to PC#305.

PC#s 305 to 307, as shown in Fig. 11b, operate to route the three control words into the H, G, and F registers.

Thus, in PC#305, the first control word, the address of which (modified base address) has just been located, is sensed in digital form by the corresponding storage channel head (as activated by flip-flops L1 to L4), and the output of this head triggers flip-flop M1. Arithmetic unit 114 causes the output of flip-flop M1 to be read into the H register, replacing the information previously therein. The equation to represent this activity is $H_0 = M_1$.

Similarly, by means of equations $G_0 = M_1$ and $F_0 = M_1$, in PC#s 306 and 307, respectively, the second and third control pattern words are set up in the G and F registers, since, it will be recalled, the addresses of the three control words are sequential.

Thus, in PC#307, the entire control pattern is available to arithmetic unit 114 through recirculation in the registers. An additional function of PC#307 is to preset flip-flop K1, by means of the equation $k_1 = O_{13}P_2 C$, to the true state for use in PC#310.

*Test for omitted segment*

The main purpose of PC#310 (Fig. 11d) is to check for a segment provided for in the control pattern, but omitted from coding on the tape, as would occur, for instance, where the control pattern is arranged to provide for the inclusion in sales data of an item such as luxury tax, which, for a particular transaction, no charge was made, and, consequently, was not rung on the store cash register.

For this purpose, flip-flops A9 to A12 are reset false at the beginning of the word period and subsequently set up with the segment identification number from the H register (control pattern) during $O_{12}P_0$—$O_{13}P_0$. Flip-flops A1 to A4, it will be recalled, carry the frame identification number read from the tape, which serves also as the segment identification number for the first segment of the frame, and will hereafter be referred to as such. To make the tape segment identification number available, flip-flops A1 to A4 are connected as a cyclical shift register, by means of the equations shown, such that, on successive clock pulses, the content of a flip-flop in the register is made to correspond to that of the preceding flip-flop for the preceding pulse position: flip-flop A3 "follows" flip-flop A4, flip-flop A2 "follows" flip-flop A3, flip-flop A1 "follows" flip-flop A2, and flip-flop A4 "follows" flip-flop A1. It is thus noted that the period equivalent of four pulse positions is required for the code in flip-flops A1 to A4 to pass through one of the flip-flops in a chain. Thus, by observing flip-flop A1, the segment identification number from the tape is made available to arithmetic unit 114 every four pulse positions in the word period.

It can be seen that the aforementioned test is performed utilizing flip-flop K1, which enters PC#310 true and is set false by the equation:

$$_0k_1 = (A_1 H_1' + A_1' H_1)(O_{12}P_0 - O_{13}P_0) C$$

being satisfied. If the equation is satisfied (the segment identification numbers are unequal), the computer sequences to an operation (commencing with PC#311) which eliminates from the control stream that portion corresponding to the omitted segment. If the equation is not satisfied (the segment identification numbers are equal), the computer sequences to an operation (commencing with PC#320) which reads in the tape digits corresponding to the segment.

Further, in PC#310, flip-flops L1 to L4 are reset false and a marker is inserted in $O_3P_2$ of the E register, the latter for use if a count to PC#311 is made.

Thus, in summary, the computer enters PC#320 if a segment is to be read in, or enters PC#311 if the control pattern corresponding to a segment available on the tape is yet to be located. The former contingency will be discussed first.

*Segment read-in*

The sequence from PC#320 to PC#327 (Figs. 11a and 11c) is concerned with reading in a segment. In PC#s 320 and 321, the P and N numbers corresponding to the data unit of the segment are arranged in the control stream so as to be available; in PC#s 322 to 324, digits of the data unit are transferred from the tape to the E register; in PC#325 the J number corresponding to the data unit is arranged in the control stream so as to be available; and in PC#s 326 and 327, the data unit is transferred from the E register to the J buffer register.

Referring to PC#320, it is seen that the E register is not recirculated, thereby clearing it of the marker set up in PC#310, if entry is therefrom, or clearing it of any data unit set up by a prior sequence through PC#320 to PC#327, if entry is from PC#327. Flip-flops A1 to A4 and A9 to A12 are reset false for subsequent use. A special shift is made by means of the special shift equations (Fig. 11a) which, for ease of reference, have been presented separately.

The effect of arranging the networks of arithmetic unit 114 to provide for a special shift is twofold. Firstly, the H, G, and F registers, which recirculate the first, second, and third control words, respectively, are arranged as a single "three-word" register, with information originally in the H register being presented to arithmetic unit 114 chronologically first and information originally in the F register being presented chronologically last. This is accomplished, as will be shown, by connecting the registers through networks using flip-flops A5 to A8 to join the H and G registers and flip-flops L1 to L4 to join the G and F registers. Secondly, the shift of information in the registers occurs timewise as follows: in the H register, from right to left; in the G register, from left to right; and in the F register, from right to left.

The special shift is accomplished for units of four pulse positions, i.e., the storage required for one decimal digit, each time the special shift equations are effective. Thus, during a one word period duration of PC#320, as the equations show, flip-flop A8 picks up, one at a time, the digits of the segment identification number in the H register and, at each clock pulse, transfers its digit to flip-flop A7, thence to flip-kops A6 and A5. The rest of the control word in the H register follows the segment identification number through flip-flops A8 to A5 in the same fashion. From the $H_0$ equation, it is seen that this information is picked up from flip-flop A5 and is established in the H register during period $O_1P_1$—$O_{13}P_2$. Thus, only the segment identification number is deleted from the H register and the P number of the data unit is set up in positions $O_{12}P_0$—$O_{13}P_0$ of the H register. Further, it is seen that the decimal digit occupying positions $O_0P_0$—$O_1P_0$ of the G register is set up in these positions of the H register by the term $G_5(O_0P_0$—$O_1P_0)$ in the $H_0$ equation.

Flip-flops L1 to L4 operate to shift the information in the F register left, respectively and data is shifted in the G register by causing $G_0$ to follow $G_1$ during periods $O_{0-11}$ and to follow $F_1$ during $O_{12-13}$. The $G_1O_{0-11}$ term of the $G_0$ equation makes use of the four clock period delay which information recirculating in the G register experiences between flip-flops G1 and G5, while the $F_1O_{12-13}$ term fills positions $O_{12}P_0$—$O_{13}P_0$ of the G register with the corresponding decimal digit in the F register, and positions $O_{13}P_1$—$O_{13}P_2$ with zeros as are required in these positions of the F and G registers.

In summary, the special shift during PC#320 sets up the P number of the segment data unit in positions $O_{12}P_0$—$O_{13}P_0$ of the H register.

Similarly, during PC#321, a special shift occurs to set up the N number of the segment data unit in positions $O_{12}P_0$—$O_{13}P_0$ of the H register. Additionally, it is noted from the $a_9$ to $a_{12}$ equations that the P number is set up in flip-flops A9 to A12.

Thus, when PC#322 is entered, control information is available to govern reading out a digit of information of a tape data unit into the E register.

During PC#322, the tape reader is started and a decimal digit from the tape is set up in flip-flops A1 to A4.

The main function of PC#323 is to preset flip-flops A5 to A7 for use in PC#324. Thus, flip-flops A5 and A6, which operate as a binary counter having a capacity of four, are preset true and false, respectively, to indicate a count of 1. Flip-flop A7, which functions to control the transfer of digits in A1 to A4 (read from the tape) to the E register, is preset true only if at least one of the flip-flops A9 to A12 (P number) is true.

It is in PC#324 that the tape information digit, stored in flip-flops A1 to A4, is set up in the E register in positions as called for by the P number stored in flip-flops A9 to A12.

Explaining counters A5 and A6 in greater detail, from the $a_5$ and $_0a_5$ equations, it is seen that, for period $O_0P_0$—$O_{11}P_0$, flip-flop A5 changes state at the fall of each clock pulse, and is true for the rest of the word period. From the $a_6$ and $_0a_6$ equations, it is seen that, for period $O_0P_0$—$O_{11}P_0$, flip-flop A6 changes state at the fall of every other clock pulse, and is true for the rest of the word period, except for a reset to the false state at $O_{13}P_1$. Thus, considering flip-flops A5 and A6 together, it is seen that: for period $O_0P_0$—$O_{11}P_0$, they comprise a binary counter which makes four counts (decimally "1," "2," "3," "0," "1," "2," etc.) with a different content each pulse position; for period $O_{11}P_1$—$O_{13}P_1$, they retain the count of "3"; and, at $O_{13}P_2$, they are reset to the count of "1."

Reference to the equations governing flip-flop A9 will indicate that this flip-flop changes state for each count of "3" in flip-flops A5 and A6, i.e., at intervals of 4 clock periods, until $O_{11}P_1$, after which it changes at the fall of each clock pulse. The equations for flip-flop A10 show that this flip-flop changes state for each count of "3" in flip-flops A5 and A6 occurring simultaneously with a false state of flip-flop A9 until $O_{11}P_1$, after which it changes at the fall of every other clock pulse. Similarly, flip-flop A11 changes state and flip-flop A12 changes state as indicated in Fig. 27, until $O_{11}P_1$, after which they change state and remain thus to the end of the word period. The net effect of this activity is to cause the decimal equivalent of the content of flip-flops A9 to A12 to be reduced by one unit at intervals of four clock periods until the count therein is "0," after which the count sequences to "15," "14," "13," etc. finally ending up the word period at a count which is one unit greater than at the start of the word period. For example, if the P number contained in flip-flops A9 to A12 is "3" when the computer enters PC#324, the P number will be increased to "4" by the time the computer leaves PC#324. Thus, when PC#324 is entered, the content of flip-flops A9 to A12 indicate the P number corresponding to the tape information digit presently stored by flip-flops A1 to A4.

Flip-flop A7 enters PC#324 true unless the count in flip-flops A9 to A12 is "0," and is set false during PC#324 when the count in flip-flops A9 to A12 reaches "0." In other words, the count in flip-flops A9 to A12 must be "0" throughout the loop designated "Fill E register from tape" in Fig. 11a in order for flip-flop A7 to be false during all of PC#324. Thus, flip-flop A7 is triggered into a false state at the start of the decimal digit position represented by the P number.

Regarding next the equations for flip-flops A1 to A4, it is apparent that the taped digit is recirculated in these flip-flops only when flip-flop A7 is true, otherwise they are reset false. Observation of the second term of the equation $E_0=E_5+A_1A_7'$ indicates that transfer of the tape information digit occurs when flip-flop A7 goes false, or as mentioned, at the decimal digit position specified by the P number.

With reference to the $H_0$ equation, it is observed that the N number in period $O_{12}P_0$—$O_{13}P_0$ is reduce by one unit each time the computer sequences through PC#324 by the term $(H_1A_8'+H_1'A_8)(O_{12}P_0$—$O_{13}P_0)$, and the equations for flip-flop A8. These are interpreted as meaning that proposition $H_0$ from arithmetic unit 114 simultaneously observes the contents of flip-flops H1 and A8. When they are different, the equation is satisfied and a "1" is recorded in the H register during period $O_{12}P_0$—$O_{13}P_0$. When they are the same, the equation is not satisfied and a "0" is recorded in the H register. Flip-flop A8, which is preset true, goes false at the end of the first clock period during period $O_{12-13}$ at which flip-flop H1 is observed to be true, and remains so for the rest of the counting period. The result of this operation is that binary number in the H register, representing the N number, is reduced by one unit each word period PC#324 is effective.

The last operation in PC#324 is a test in which flip-flop K1 is employed to cause a count to PC#325 if all the decimal digits of a data unit read from the tape have been set up in the E register, or a skip back to PC#322 if one or more decimal digits yet remain to be set up. Flip-flop K1, it is observed, enters PC#324 in the false state and is set true in the event flip-flops H1 and A8 are in opposite states for any clock period during period $O_{12}P_0$—$O_{13}P_0$. This will occur if the N number presently in period $O_{12}P_0$—$O_{13}P_0$ of the H register is other than zero. In other words, when the period $O_{12}P_0$—$O_{13}P_0$ of the H register contains zeros, the computer counts to PC#325.

The main activity of PC#325, as shown in Fig. 11c, is a special shift such that the J number associated with the data unit is set up in period $O_{12}P_0$—$O_{13}P_0$ of the H register.

In PC#326 the J buffer register word specified by the J number is looked up using the octal units digit of the arc addresses recorded in period $O_{12}$ of arc address channel 109 (Fig. 4) and, when found, a count is made to PC#327.

The equation $J_0 = E_5 + J_1$ in PC#327 effectuates a transfer of the data unit from the E register to the word place in the J buffer register defined by the J number. Flip-flop A1 to A4 and A9 to A12 are reset false. A test is made, using flip-flop K1, to determine whether or not the data unit just transferred is the last in the segment. If not, a skip back to PC#320 is made so that subsequent data units may be handled. If so, a count is made to a sequence which provides for subsequent segments. The test resides in the equation $k_1 = (H_1'O_{13}P_0 + O_{13}P_2)C$ and the false state of flip-flop K1 on entering PC#327. It has been noted that individual words of the J buffer register are identified with reference to the octal units digit of the arc addresses in arc address channel 109.

It is seen that, for all words, position $O_{13}P_0$ contains a zero. This position is consequently employed to distinguish a J number which corresponds to the last data unit of a segment, by inserting a one therein, to serve as an end of segment indicator (ESI). This may be further understood by reference to Fig. 25, which shows a one inserted in the position following the control information for the fourth data unit, which is the last data unit in the first segment.

The aforementioned test thus identifies the end of a segment by permitting flip-flop K1 to remain false only if there is an end of segment indicator in $O_{13}P_0$ of the H register when the J number is occupying period $O_{12}P_0$—$O_{13}P_0$ thereof. A false state of flip-flop K1 at the end of a word period of PC#327, of course, sequences the computer to PC#330.

The activity of PC#s 330 and 331, as shown in Fig. 11d, provides for setting up the next tape segment identification number in flip-flops A1 to A4. The corresponding logic has already been treated, particularly with reference to PC#s 301 and 302 (Fig. 11a). PC#332 functions simply to sequence the computer through a skip to PC#312.

Referring again to the program control block designated PC#310, it will be recalled that a contingency arises during the operations then performed if no data corresponding to a particular identification number appeared on the tape. In that event, it becomes necessary to render ineffective that portion of the control pattern applicable to data assigned that identification number. Omission of that portion of the control pattern from the effective program of control operations will next be discussed.

*Elimination of control pattern*

In PC#311, a special shift is made of the control pattern a sufficient number of times such that the segment identification number corresponding to the segment which is next present on the tape is set up in period $O_{12}P_0$—$O_{13}P_0$ of the H register.

The control for this special shift may be regarded as twofold; the marker established in $O_3P_2$ (twelfth pulse position from the right end) of the E register during PC#310, and the end of segment indicator which occurs in the H register only for the J number corresponding to the last data unit of a segment. These combine to cause flip-flop K1 to be false at $O_{13}P_2$, thereby forcing the computer out of PC#311.

It is first noted that the marker in the E register is shifted four pulse positions to the right during period $O_{0-3}$ of each word period by causing proposition $E_0$ to follow the output of flip-flop E1. Since only twelve pulse positions comprise period $O_{0-3}$, it is obvious that only two such shifts can be made before the marker is lost; or, in other words, the E register will be clear when a J number is set up in period $O_{10}P_2$—$O_{11}P_2$ of the H register.

It is further noted from the equations representing the action of flip-flop K1 that this flip-flop enters PC#311 true for the first word period but afterwards enters each word period of PC#311 in the false state and is triggered true by either the marker as it is picked up in flip-flop E1 or a false state of flip-flop H1 at $O_{11}P_2$. In other words, flip-flop K1 will remain false during a word period when, for the next word period, the E register will be clear and a J number modified by an end segment indicator will be set up in period $O_{12}P_0$—$O_{13}P_0$ of the H register by a special shift. The $K_1'O_3P_2$ term of the $E_0$ equation reestablishes the marker in the E register for data units other than the first and last in a segment.

*Test for end of control pattern group and addresses*

During PC#312, a test is made for the end of a three-word group in the control pattern. If the control pattern group has not been exhausted, a skip is made to PC#317 where a special shift is made to the control pattern for the next segment, the logic for which has already been described, and this is followed by reentry to PC#310. If the control pattern group has been exhausted, a count is made to PC#313.

The test employs flip-flop K1 arranged to examine the H register for zeros during period $O_{0-7}$. It has been pointed out that an address is set up in the control pattern group immediately following the last J number. This address may locate the first word of an additional control pattern group, in the case where the transfer of a frame of information from the tape so requires, or may comprise the control number. Regardless of which address is set up, only twelve pulse positions of the H register are required. Since, during PC#312, a last J number occupies period $O_{12}P_0$—$O_{13}P_0$, the address occupies period $O_{8-11}$, and it is only period $O_{0-7}$ which would contain zeros if the end of a control pattern group is set up in the H register. Thus, if the end of a control pattern group is identified, the computer counts to PC#313.

It should be obvious from the fact that, in this computer, sixteen channels on drum 101 are devoted to storage, the most significant octal digit of a channel address, coded binarily, can only be either "000" or "001". It is seen that, in either case, the most significant binary digit is "0." Consequently, to distinguish between the address of the first word of an additional control pattern group (corresponding to the next tape frame) and the control number (identifying the next command), the former is set up to contain a "1" in the most significant binary digit position and the latter is set up to contain a "0," these indicators being designated as "address indicators" (AI). It follows, therefore, that if the H register contains a "1" in $O_{11}P_2$, the address at the end of the control pattern group is that of the first word of an additional group of three control pattern words. If, in PC#313, this "1" is found, the computer skips back to PC#303 so that the next control pattern group may be set up in the H, G, and F recirculating registers.

It is further noted that the address in the H register is also recorded in the G register by means of the equation $G_0 = H_1$. This is done in the event that the address is the control number, in which case, to be set up properly, it must be shifted to occupy period $O_{4-7}$. The facilities of the G register will be subsequently employed to accomplish this shift.

*Test for Error*

It now should be apparent that, by the time the computer enters PC#314, a frame of tape information should be recirculating in the J buffer register and the control pattern corresponding to this frame should be exhausted. This program count block is provided to test for deviation from this condition by examining the next digit received from the tape. If this digit represents either the frame symbol or the run-in symbol of Fig. 24, it is obvious that a complete frame has been handled and no error of the above nature has occurred; thus the computer counts to PC#315. If the digit does not represent either of these symbols, an error has been made and the computer automatically skips to a routine designated "error print" which accomplishes an automatic indication that an error has occurred.

The test resides in the equation:

$$k_1 = (A_1'A_3 + A_2' + A_1A_3' + A_4')C$$

which examines flip-flops A1 to A4 for content set up (in PC#330) by signals on lines T1 to T4, respectively (Fig. 24). It is seen that flip-flop K1, which enters PC#314 false, is triggered true to cause a skip to the "error print" routine if a code representing any decimal digit is set up in flip-flops A1 to A4; and only for the codes representing the frame and run-in symbols will flip-flop K1 remain false to cause a count to PC#315.

Set up control number

Another function performed during PC#314 is a shift of the control number four positions to the right by the equation $G_0 = G_1$. An additional four pulse position shift is accomplished during PC#315. In PC#316, the control number is retransferred to the H register by the equation $H_0 = G_1$ which also provides a similar shift, thereby positioning the control number properly for subsequent computer operations. From PC#316, a skip is made to the rest condition to await the identification and execution of the next command.

It should now be apparent, after having described each of the word blocks of the flow diagram, that certain operations and, therefore, certain of the proposition equations, recur frequently. It is well known in logical design that it is not necessary to repeatedly generate a particular term or logical combination of terms since, once generated, the terms may be employed in networks wherever functionally appropriate. It is with this in view that the final composite equations and diode networks shown in Figs. 12 to 22 have been designed. It should be understood, of course, that only a portion of the composite network is made operative at a time. This portion is determined by which of the outputs of program counter 115 is at the high potential.

EXAMPLE

An illustration of the read-in system of the present invention will next be given with particular reference to Figs. 23 to 27 which concern one cash register transaction relating to a sale of merchandise by a retail store.

Fig. 23 presents a section of tape to be read into the computer. Information from the tape is sensed in the tape reader from right to left as shown and, prior to entering PC#301 of the routine, the tape is at a halt at the right frame symbol position after having run in from the end. It is seen that the frame of information on this section of tape consists of six segments, identified by the segment identification numbers "2" (also the frame identification number), "6," "3," "1," "4," and "5." Some of the segments are labelled to refer to the information represented. Thus, the fourth (segment identification number "1") is a sales clerk segment which comprises the sales department (first data unit, "39") and the clerk number (second data unit, "579") entered into the cash register by the sales clerk at the time of the sale; the fifth segment (segment identification number "4") is a merchandise segment entered into the cash register from the price tag of the item sold.

Fig. 26 presents the J buffer register set up in accordance with the design of the programmer in arranging the information from a frame identification number "2" frame. It is obvious that this arrangement most likely would be different from that for a frame of any other type (Table I). Here the eight words of the J buffer register, addressed from 0 to 7, inclusive, are shown set up with the frame information rearranged for subsequent computer operations and read-out as desired by the programmer. Thus, price information (fifth segment, third data unit is to be set up in word 1, merchandise style and class in words 6 and 7, respectively, etc.

The control pattern organization devised for this transfer is shown in Fig. 25. Here it is seen that six control words are required to adequately store instructions for properly allocating the data units in the J buffer register. These words are contained in storage registers with addresses 1513, 1514, 1515, 1521, 1522, and 1523, and, as already presented, contain the information which the computer will refer to during the routine. Thus, storage register 1513 indicates that the first segment of the frame with frame identification number "2" will, of course, be identified by the segment identification number "2." The first data unit in this segment is to be transferred as follows. The first digit "8" of the three-digit (N number) data unit is to occupy decimal digit position $D_3$ (P number) that is, period $O_4P_0$—$O_5P_0$, in word O (J number) of the J buffer register, the rest of the digits "7" and "9," to follow sequentially and be stored in decimal digit positions $D_4$ and $D_5$, in period $O_5P_1$—$O_7P_2$ of word O. The control information for the last data unit in this segment is entered in storage register 1514 and indicates that transfer for this data unit is to be as follows. The first digit "7" of the two-digit (N number) data unit is to occupy decimal digit position $D_0$ (P number) in period $O_0P_0$—$O_1P_0$, and the second digit "2" is to be stored in position $D_1$, in period $O_1P_1$—$O_2P_1$, of word 2 (J number). The end of segment indicator set up in the J number indicates that this data unit is the last in this segment.

Since more than one three-word control pattern is required for handling this frame, storage register 1515 contains the address 1521 which the address indicator, in $O_7P_2$, being a "1," shows to be the first word of a second control pattern. The last word of the second control pattern in storage register 1523 is set up with the control number as shown by the address indicator in $O_{11}P_2$ being a "0."

The command of Fig. 2, contained in the H register, is seen to comprise the instruction "read in from tape reader," represented by a code in period $O_{12-13}$, which instruction is identified in the "command identification" routine (Fig. 11) and causes the computer to be sequenced to PC#301. Here, the tape reader is energized to cause the tape to move, the code for the segment identification number "2" to be sensed, lines T1 to T4 from code converter 188 to be arranged such that signal $T_2$ is high and signals $T_1$, $T_3$, and $T_4$ remain low, and flip-flops A1 to A4 to be set up by these signals accordingly. During PC#302, the base address 1503 in period $O_{8-11}$ of the H register is modified to become 1513 by means of a "1" inserted in $O_9P_0$ as a result of the true state of flip-flop A2.

The sequence from PC#303 to 307 sets up the H, G, and F registers with the first group of three words of the control pattern as shown in Fig. 25. The computer enters PC#310 wherein the segment identification number in the H register is compared with the segment identification number from the tape as set up in flip-flops A1 to A4. Since, for the first segment of a frame, the source of the segment identification number in the H register is the segment identification number read from the tape, presuming no error, for this segment the comparison must indicate equality. Thus, PC#320 is entered.

A special shift is made and it is noted that the P number ("3") for the first data unit of the first segment now is in period $O_{12}P_0$—$O_{13}P_0$ of the H register, and the segment identification number ("2") is lost. Also, the P number ("0") for the fourth data unit of the first segment is shifted from period $O_0P_0$—$O_1P_0$ of the G register to occupy period $O_0P_0$—$O_1P_0$ of the H register, the segment identification number ("3") for the first data unit of the third segment is shifted from period $O_{12}P_0$—$O_{13}P_0$ of the F register to occupy period $O_{12}P_0$—$O_{13}P_0$ of the G register, the address of the fourth control word is shifted from period $O_{4-7}$ to occupy period $O_{5-8}$, zeros occupy period $O_0P_0$—$O_5P_0$ of the F register, etc. During PC#321, the P number "3" is set up in flip-flops A9 to A12 and a special shift is made to bring the N number "3" into period $O_{11}P_0$—$O_{12}P_0$ of the H register.

During PC#322, flip-flops A1 to A4 are set up with the first digit "8" read from the tape.

During PC#323, flip-flops A5 and A6 are set to indicate a count of "1." Since the P number is not "0," flip-flop A7 is set true.

During PC#324, activity is as shown in Fig. 27. Flip-flops A5 and A6, it is seen, repetitively make counts of four through $O_{10}P_2$ and thereafter operate so as to end the word period as they entered, namely, at a count of "1." The decimal number registered in flip-flops A9 to A12 reduces sequentially from the initial setting of "3" to "0," after which the next count is "15," which in turn reduces sequentially to "4." Thus, the P number registered in flip-flops A9 to A12 at the end of the word period is one more than at the beginning. Flip-flop A7, for the first excursion through PC#324 for a particular data unit (recording of the first digit "8") is triggered false at $O_3P_2$. The N number in period $O_{12}P_0$—$O_{13}P_0$ of the H register is reduced by one unit to "2" and the digit "8" is set up in the E register in period $O_4P_0$—$O_5P_0$.

The computer skips out of PC#324 back to PC#322 and repeats the recording process, resulting in the second digit, "7," of the first data unit of the first segment being recorded in period $O_5P_1$—$O_6P_1$ of the E register. The content of flip-flops A9 to A12 is "5" and the N number in period $O_{12}P_0$—$O_{13}P_0$ of the H register is "1."

The sequence from PC#322 to 324 is again conducted and the last digit "9" of this data unit is recorded in period $O_6P_2$—$O_7P_2$ of the E register. The content of flip-flops A9 to A12 is "6" and the N number in period $O_{12}P_0$—$O_{13}P_0$ of the H register is "0." The N number presently being "0," a count is made to PC#325.

A special shift to the J number "0" for the first data unit is made. Word O of the J buffer register is looked up during PC#326 and the data unit is set up therein during PC#327. Flip-flops A1 to A4 and A9 to A12 are set false.

The other data units of the first segment are similarly recorded into the J buffer register.

When the J number "2" for the last data unit of the first segment is set up in period $O_{12}P_0$—$O_{13}P_0$ of the H register, the end of segment indicator (originally in $O_3P_2$ of the G register) is in $O_{13}P_0$ of the H register, thereby causing a count from PC#327 to PC#330.

During PC#s 330 and 331, the next segment identification number "6" from the tape is established in flip-flops A1 to A4.

PC#332 arranges for a skip to PC#312 where the test for end of the control pattern group fails. During PC#317, a special shift is made to set up the segment identification number "6" in period $O_{12}P_0$—$O_{13}P_0$ of the H register. This segment, as well as the next (segment identification number "3"), is handled in a manner similar to the first. At this time, the H register is arranged as shown in Fig. 28; and during PC#312, the test indicates that the first control pattern group has been exhausted.

During PC#313, the address indicator evidences that the address in period $O_{8-11}$ of the H register, namely, "1521," is that of the first word of an additional group of control pattern words. The computer sequences to PC#303 and repeats the activity which records the rest of the frame into the J buffer register using this control pattern group. When this recording is completed, the H register appears as in Fig. 29 on entering PC#313.

The address indicator now evidences that the address in period $O_{8-11}$ of the H register ("1635") is a control number, causing a count to PC#314. Regardless of the nature of the address, it is shifted to occupy period $O_6P_2$—$O_{10}P_1$ of the G register.

During PC#314, the test for error fails since the coding set up in flip-flops A1 to A4 results from the pick up of the leftmost frame symbol in Fig. 23.

The control number is shifted to occupy period $O_5P_1$—$O_9P_0$ of the G register. During PC#315, the control number is again shifted to occupy period $O_{4-7}$ of the G register, and during PC#316 the control number is retransferred to the H register. The computer sequences to the rest condition. The result of the above routine is that the J buffer register is set up as shown in Fig. 26.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. An input system for a computer having a memory, comprising: input means set up with sequential incoming signals representing information divided into groups, each group being preceded by an identification signal; storage means; a register for storing a plurality of sets of control signals indicative of positions in said storage means to which the incoming signals are to be transferred, a set of said control signals corresponding to each incoming group of information signals, one set of control signals being in a working position in said register at a time; means to transfer subsequent information signals from said input means to said storage means in accordance with the set of control signals in the working position of said register when an identification signal is received on said input means corresponding to said set of control signals; and means for shifting the next set of control signals into the working position of said register when the identification signal received on said input means does not correspond to the set of control signals in the working position of said register.

2. An input system for a computer having a memory, comprising: input means set up with sequential incoming signals representing information divided into groups, each group being preceded by an identification signal; storage means associated with said memory; a register associated with said memory for storing a group of transfer control signals, each said latter group being preceded by an identification signal; means for comparing an identification signal received by said input means with an identification signal in said register; means to transfer the information signals from said input means to said storage means in accordance with the transfer control signals when said comparing means indicates a group of information signals corresponding to the transfer control signals is being received on said input means; and means for shifting the transfer control signals in said register so that the next identification signal can be compared when said comparing means indicates a group of information signals not corresponding to the transfer control signals is being received on said input means.

3. A system for transferring digital information from a tape to a cyclically operating computer memory in accordance with a predetermined arrangement, successive portions of information on said tape being preceded by identifying signals, comprising: means for successively sensing signals as said tape is intermittently advanced; a first recirculating register in said memory; a second recirculating register in said memory for storing signals corresponding to the portion-identifying signals on the tape and position signals in said first recirculating register; comparing means for generating a signal when the portion-identifying signals sensed by said sensing means corresponds with the identifying signals in said second recirculating register; and means operable to transfer successive information signals sensed by said sensing means to positions of said first recirculating register defined by said position signals in said second recirculating register in response to a signal from said comparing means.

4. An input system for a computer having a memory, comprising: input means set up with sequential input signals representing information divided into groups in predetermined order, each group identified by a control signal; storage means connected to store signals set up in said input means; a register in the memory of the computer for sequentially storing groups of control signals corresponding to groups of signals received on said input means, said control signals indicative of the position in said storage means to which information signals received on said input means is to be transferred; means operable when a group control signal is set up in said input means corresponding to a group of control signals in said register to transfer the following information signals received on said input means to said storage means in accordance with the remainder of said control signals; said latter means being operable when a group control signal set up in said input means does not correspond to the group of control signals in said register for causing the control signals in said register to be shifted such that the following group of control signals is available.

5. In a computer having a memory, an input system, comprising: a set of lines set up sequentially with groups of information signals, a control signal preceding each group and a signal indicating the end of each group; a register connected to said set of lines for storing a signal received therefrom; storage means connected to said register; a plurality of groups of control pattern signals in the memory of the computer, each said latter group containing a signal indicating the end thereof; means responsive to a control signal set up in said register to store a particular group of control pattern signals corresponding to a group of information signals to be subsequently received on said set of lines; means responsive to said particular set of control pattern signals to transfer the information signals from said register to said storage means; and error manifesting means responsive to both the signal indicating the end of a group of information signals being received and the signal indicating the end of the particular set of control pattern signals to manifest error when both signals do not occur simultaneously.

6. A system for transference of information into a digital computer from an outside source, the information being sensed from a moving tape as binary coded digits arranged to form sub-groups, the sub-groups further arranged to form a group, the arrangements being in accordance with a predetermined classification, comprising: means to control the motion of the tape; a set of lines set up sequentially as the tape advances with signals representing the digits; an input register connected to said set of lines for storing signals received therefrom; a pattern of control signals stored in the computer memory; a one-word intermediate register connected to said input register; a first means responsive to a first signal in said pattern of control signals to transfer a sub-group of digit signals, a digit at a time, from said input register to digit positions in said intermediate register specified by a second signal in said pattern of control signals; a multi-word buffer register; a second means responsive to a third signal in said pattern of control signals to transfer the sub-groups of digits from said intermediate register to corresponding digit positions in a particular word of said buffer register, said first and second means successively operating until a group of digit signals has been transferred from said tape to said buffer register.

7. An input system for a computer having a memory, comprising: a set of lines set up with sequential input signals representing information divided into groups in predetermined order, each group being preceded by an identification signal; a register connected to said set of lines for receiving signals therefrom; storage means connected to said register; a plurality of groups of control pattern signals stored in the memory of the computer; control means responsive to an identification signal set up in said register to store a particular group of control pattern signals corresponding to a group of information signals to be subsequently received on said set of lines, said control pattern signals indicative of the number of sequential information signals in each group and the particular position in the register to which an information signal is to be transferred; means operable to transfer the information signals from said register to said storage means in accordance with the appropriate control pattern signals in said control means; and means responsive to an indicator signal in said group of control pattern signals stored in said control means to select an additional group of control pattern signals from the memory of the computer where a plurality of groups of control pattern signals are required for transferring the group of information.

8. Apparatus for transferring coded data from a record member containing a plurality of data units, each data unit consisting of one or more digits, to predetermined locations in a storage register associated with a digital computer, comprising: a control register adapted to receive coded control data indicative of the number of digits in each data unit and the particular position in the storage register to which a data unit is to be transferred; means for shifting the control data in the control register so as to render the control data available for controlling the reading-out of the data from the record member; means for transferring a data unit digit by digit from the record member to said storage register in accordance with the control data; and means for modifying the control data upon each transfer of a digit to said storage register so as to indicate the position in the storage register to be occupied by the succeeding digit to be transferred thereto and to indicate the number of remaining digits in the data unit to be transferred thereto.

9. Apparatus for transferring coded data from a record member containing a plurality of data units, each data unit consisting of one or more digits, to predetermined locations in a multi-word storage register associated with a digital computer, comprising: a control register adapted to receive coded control data indicative of the number of digits in each data unit and the particular word and position in that word in the multi-word storage register to which a data unit is to be transferred; means for shifting the control data in the control register so as to render the control data available for controlling the transfer of data read from the record member; an intermediate one-word storage register; means for transferring a data unit digit by digit from the record member to said one-word intermediate storage register in accordance with the control data; means for modifying the control data upon each transfer of a digit to said one-word intermediate storage register so as to indicate the position in the one-word intermediate storage register to be occupied by the succeeding digit to be transferred thereto and to indicate the number of remaining digits in the data unit yet to be transferred thereto; and means for transferring digits stored in said one-word intermediate storage register to a particular word of the multi-word storage register in accordance with the control data when the modified control data indicates that a complete data unit has been transferred from the record member to said one-word intermediate storage register.

10. Apparatus for transferring coded data from a record member containing groups of data units, each data unit consisting of one or more digits, to predetermined locations in a storage register associated with a digital computer, each group of data units having an identification signal associated therewith, comprising: a control register adapted to receive groups of control data indicative of the number of digits in a data unit and the particular position in the storage register to which a data unit is to be transferred, each group of control data having an identification signal associated therewith; means for comparing the identification signals of said groups of control data and said data units; means for transferring a data unit digit by digit from the record member to said storage register in accordance with the control data when said comparing means indicates the same identification signals are compared; and means for shifting the control data in the control register so as to render the next group of control data available when said comparing means indicates the same identification signals are not compared.

11. In a system comprising a computer signal-storage means and a data-input apparatus, means in said storage means for storing a plurality of groups of control pattern signals, each group of control pattern signals representing a respective set of signal-storage locations in the signal-storage means to which specific input data-representing signals are to be transferred; means in said data-input apparatus effective to provide a series of data-representing signals and interspersed data-identifying signals corresponding to certain respective ones of said control pattern signals; and means responsive to control pattern signals stored in said data-storage means to effect transferral of the specific data-representing signals to the respective signal-storage locations defined by the corresponding control pattern signals stored in said storage means.

12. In a system comprising a computer signal-storage means and a data input apparatus effective to provide serially groups of input signals comprising data-representing signals and distinctive signals each associated with a respective group of data-representing signals, means in said signal-storage means providing individual signal-storage locations each assigned to a data-representing signal identified by a respective specific distinctive signal; means comprised in said signal-storage means effective to store groups of control signals each like a respective corresponding one of the said distinctive signals provided in said input signals, and each defining a respective one of said individual signal-storage locations; and means for comparing a distinctive signal provided in a group of input signals with control signals from the stored groups of control signals and responsive to a comparision identity between a distinctive signal and a control signal, to store the corresponding data-representing signal in the signal-storage location defined by the control signal in the identity.

13. A system comprising a computer signal-storage means and a data input apparatus effective to provide in a series a plurality of groups of input signals each group of which comprises a data-identification signal followed by a data-representing signal identified by the preceding data-identification signal, said system comprising means in said signal-storage means providing individual signal-storage locations each assigned to receive and store a data-representing signal identified by a particular distinctive identification signal, said signal storage means also comprising means effective to store control signals each like a respective one of data-identification signals provided in said input signals and each such control signal corresponding to and defining a respective particular one of said signal-storage locations, and said system further comprising means responsive to each data-identification signal and the like control signal to store in the respectively identified individual storage location the following data-representing signal, each in its turn in the said series and each as received.

References Cited in the file of this patent

UNITED STATES PATENTS

| 2,617,704 | Mallina | Nov. 11, 1952 |
| 2,679,638 | Bensky et al. | May 25, 1954 |
| 2,721,990 | McNaney | Oct. 25, 1955 |
| 2,770,797 | Hamilton et al. | Nov. 13, 1956 |